(12) United States Patent
Wang et al.

(10) Patent No.: US 11,586,225 B2
(45) Date of Patent: Feb. 21, 2023

(54) MOBILE DEVICE, MOBILE BODY CONTROL SYSTEM, MOBILE BODY CONTROL METHOD, AND PROGRAM

(71) Applicant: Sony Corporation, Tokyo (JP)

(72) Inventors: Chao Wang, Tokyo (JP); Dai Kobayashi, Tokyo (JP); Tatsuya Ishizuka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 54 days.

(21) Appl. No.: 16/991,056

(22) Filed: Aug. 12, 2020

(65) Prior Publication Data

US 2021/0055744 A1    Feb. 25, 2021

(30) Foreign Application Priority Data

Aug. 20, 2019    (JP) .............................. JP2019-150327

(51) Int. Cl.
*G05D 1/06*    (2006.01)
*G05D 1/10*    (2006.01)
*G05D 1/00*    (2006.01)

(52) U.S. Cl.
CPC ......... *G05D 1/0607* (2013.01); *G05D 1/0016* (2013.01); *G05D 1/0022* (2013.01); *G05D 1/0033* (2013.01); *G05D 1/0044* (2013.01); *G05D 1/104* (2013.01); *G05D 1/106* (2019.05)

(58) Field of Classification Search
None
See application file for complete search history.

(56) References Cited

U.S. PATENT DOCUMENTS

| | | | |
|---|---|---|---|
| 9,508,263 B1* | 11/2016 | Teng | G08G 5/006 |
| 2017/0144297 A1 | 5/2017 | Takaichi et al. | |
| 2017/0269587 A1* | 9/2017 | Hong | G05D 1/0016 |
| 2018/0164801 A1* | 6/2018 | Kim | H04M 1/72415 |
| 2018/0275659 A1* | 9/2018 | Ono | B64C 39/024 |
| 2018/0312274 A1* | 11/2018 | Kessler | B64D 47/02 |
| 2018/0356189 A1* | 12/2018 | Pautler | G01S 3/7864 |
| 2019/0077507 A1* | 3/2019 | Ferris | G01S 5/14 |
| 2019/0176967 A1* | 6/2019 | Ohata | G05D 1/0033 |
| 2019/0220020 A1* | 7/2019 | Macias | G01C 21/32 |
| 2021/0034078 A1* | 2/2021 | Gomez Gutierrez | B64D 45/00 |

FOREIGN PATENT DOCUMENTS

JP        2016007648 A        1/2016

* cited by examiner

*Primary Examiner* — Hunter B Lonsberry
*Assistant Examiner* — Paysun Wu
(74) *Attorney, Agent, or Firm* — Xsensus LLP

(57) ABSTRACT

Disclosed herein is a mobile device including a communication section that performs communication with a controller which selectively transmits control signals to a plurality of mobile devices, and a data processing section that performs movement control of the own device. The data processing section confirms whether or not an own-device selection signal which indicates that the own device is selected as a control target device has been received from the controller and, upon confirming reception of the own-device selection signal, performs movement control to cause the own device to move in accordance with a selected-device identification track which indicates that the own device is selected as the control target device.

17 Claims, 29 Drawing Sheets

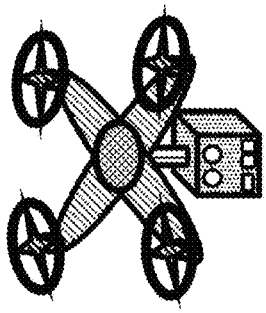
FIG. 6A
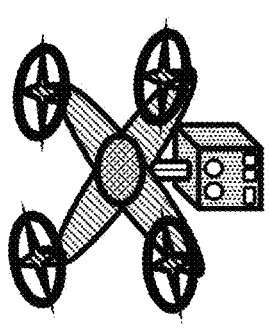
FIG. 6B
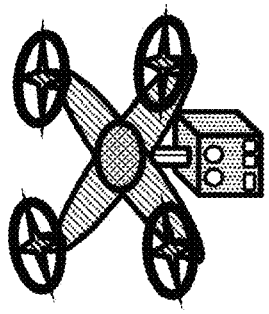
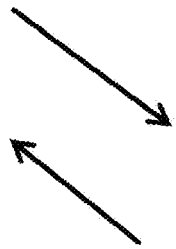
FIG. 6C

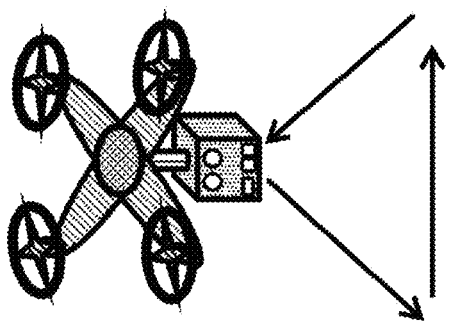
FIG. 7C  TRIANGULAR FLIGHT
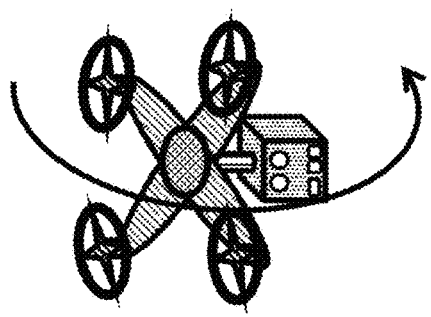
FIG. 7B  VERTICALLY ROTATING FLIGHT
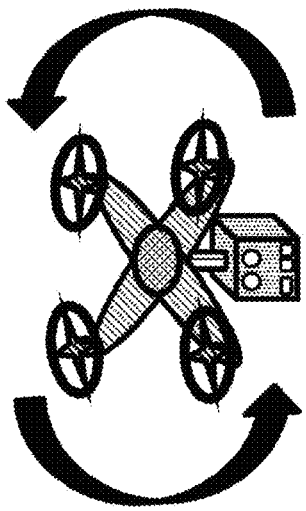
FIG. 7A  HORIZONTALLY ROTATING FLIGHT

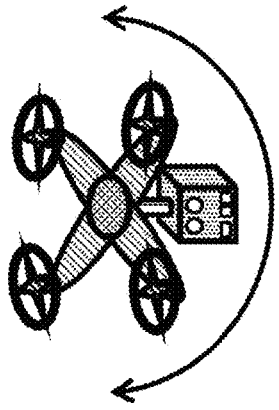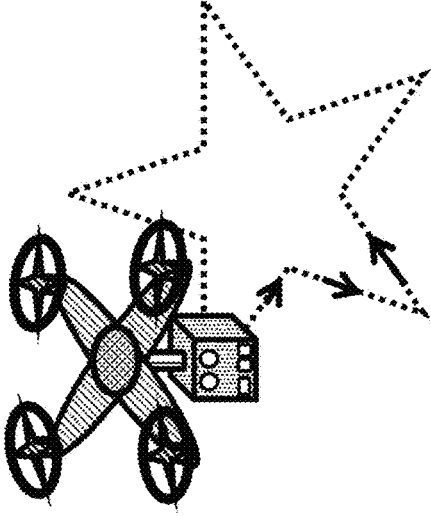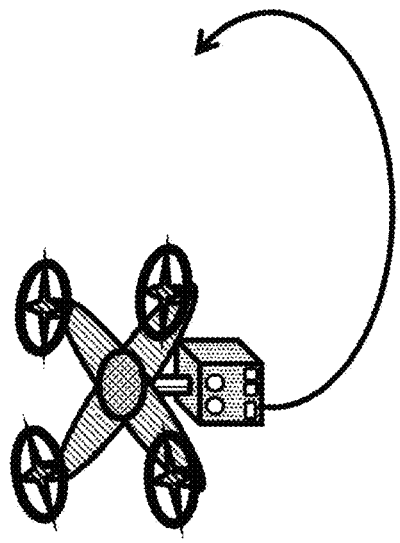
FIG. 8A  CIRCULAR FLIGHT
FIG. 8B  USER-SPECIFIED SHAPE FLIGHT
FIG. 8C  SWING FLIGHT

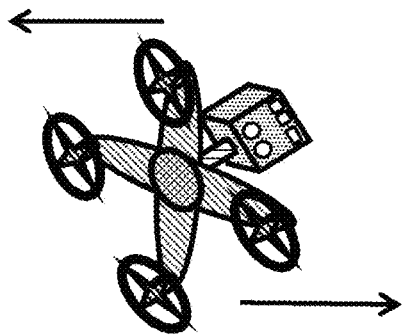
FIG. 9A TILTED FLIGHT
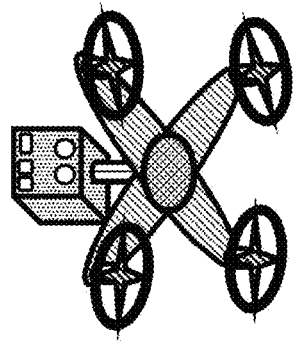
FIG. 9B VERTICALLY-INVERTED FLIGHT

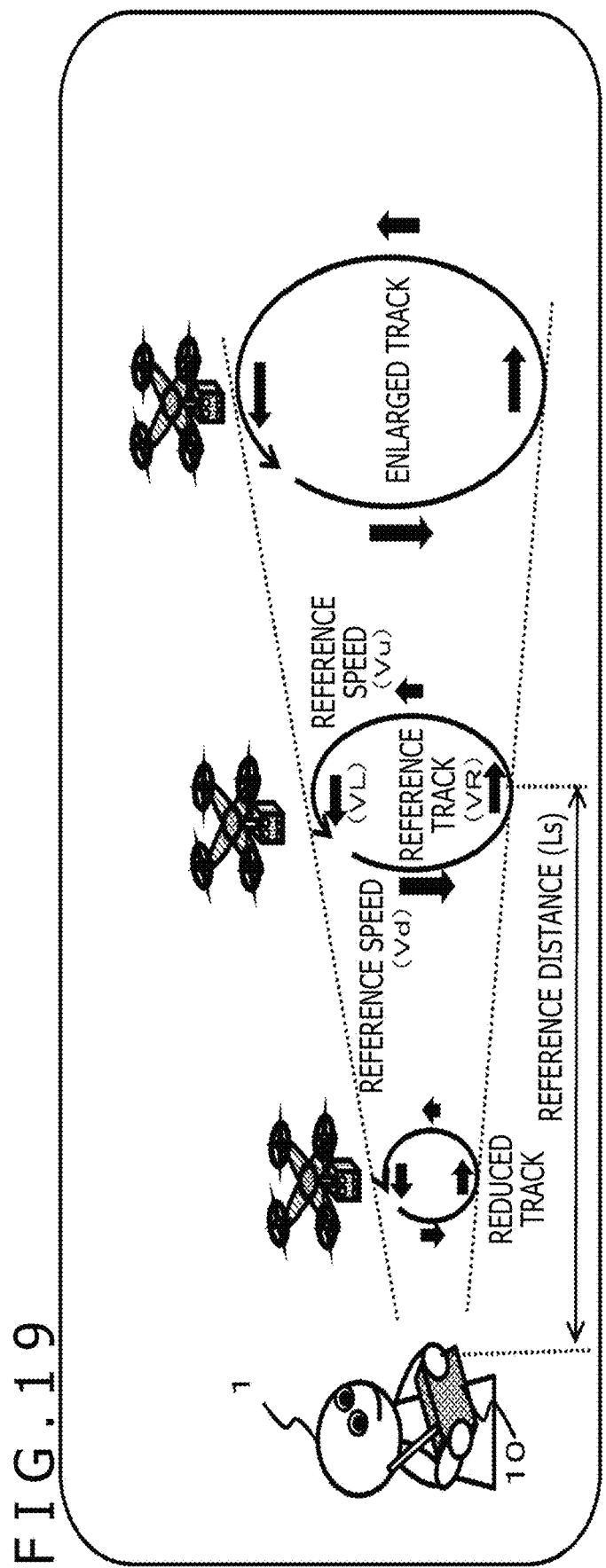

MOBILE DEVICE, MOBILE BODY CONTROL SYSTEM, MOBILE BODY CONTROL METHOD, AND PROGRAM

CROSS REFERENCE TO RELATED APPLICATIONS

This application claims the benefit of Japanese Priority Patent Application JP 2019-150327 filed Aug. 20, 2019, the entire contents of which are incorporated herein by reference.

BACKGROUND

The present disclosure relates to a mobile device, a mobile body control system, a mobile body control method, and a program. More specifically, the present disclosure relates to a mobile device, a mobile body control system, a mobile body control method, and a program by which a control target device can be reliably identified in a configuration for performing remote control on a plurality of mobile devices such as a plurality of drones, for example.

In recent years, usage of drones, which are compact flying objects configured to fly by remote control, is rapidly becoming widespread.

For example, a drone equipped with a camera is used in a process of photographing a landscape on the ground from the sky.

In addition, recently, aerial images obtained by drones are also used for processing to ascertain geographic features, for processing to survey land, or for construction sites, etc.

A drone performs flight control in accordance with an instruction from, for example, a remote controller on the ground.

Besides flight control of the flight direction, the height, the speed, etc. of the drone, control of photographing start and stop processing for a camera installed in the drone, control of setting for the photographing, etc. are also performed in accordance with an instruction from the remote controller on the ground in some cases.

In a case where switching control of a plurality of drones is performed by use of a single remote controller, even when respective device numbers are recorded on the drones, for example, it is difficult for a user (manipulator) holding the controller to visually confirm the device number of a drone that is flying in a far distance.

In this case, it is difficult for the user to identify which one of a plurality of drones in flight is a drone currently under control of the controller.

When this situation occurs, a drone may fall due to erroneous control.

It is to be noted that Japanese Patent Laid-Open No. 2016-007648 discloses an operator terminal for controlling a plurality of robots by wireless communication.

This document discloses a configuration in which identification colors unique to respective robots are assigned, and the identification color of a robot which is set as a control target of a terminal is displayed on the terminal, so that the control target robot can be identified by an operator.

However, in the disclosed configuration, the operator may need to identify the control target by checking both the color displayed on the operator terminal and a color display board installed on each of the robots.

That is, since the operator may need to check many robots and the terminal, the operator takes the eyes off the robots when checking the terminal.

There is a danger that, if, even for a moment, eyes are taken off a flying object such as a drone, the flying object falls after crashing into an obstacle.

Therefore, adopting the configuration disclosed in Japanese Patent Laid-Open No. 2016-007648 poses a danger. This is unfavorable for safety.

SUMMARY

The present disclosure has been made in view of the above problems, and it is desirable to provide a mobile device, a mobile body control system, a mobile body control method, and a program for, in a configuration of controlling a plurality of mobile devices such as drones by using a remote controller, allowing a user (manipulator) who is manipulating the controller to identify a control target device without taking the eyes off the mobile devices such as the drones.

According to a first embodiment of the present disclosure, there is provided a mobile device including a communication section that performs communication with a controller which selectively transmits control signals to a plurality of mobile devices, and a data processing section that performs movement control of the own device. The data processing section confirms whether or not an own-device selection signal which indicates that the own device is selected as a control target device has been received from the controller and, upon confirming reception of the own-device selection signal, performs movement control to cause the own device to move in accordance with a selected-device identification track which indicates that the own device is selected as the control target device.

According to a second embodiment of the present disclosure, there is provided a mobile body control system including a controller that selectively transmits control signals to a plurality of mobile devices, and a mobile device that moves upon receiving a control signal from the controller. The controller transmits, to one of the plurality of mobile devices, a selection signal which indicates that the one mobile device is selected as a control target. The mobile device confirms whether or not an own-device selecting signal which indicates that the own device is selected as a control target device has been received from the controller and, upon confirming reception of the own-device selecting signal, performs movement control to cause the own device to move in accordance with a selected-device identification track which indicates that the own device is selected as the control target device.

According to a third embodiment of the present disclosure, there is provided a mobile body control method which is executed by a mobile device, the mobile device including a communication section that performs communication with a controller which selectively transmits control signals to a plurality of mobile devices, and a data processing section that performs movement control of the own device. The mobile body control method includes causing the data processing section to confirm whether or not an own-device selecting signal which indicates that the own device is selected as a control target device has been received from the controller, and causing the data processing section to, upon confirming reception of the own-device selecting signal, perform movement control to cause the own device to move in accordance with a selected-device identification track which indicates that the own device is selected as the control target device.

According to a fourth embodiment of the present disclosure, there is provided a mobile body control method which is executed by a mobile body control system including a controller that selectively transmits control signals to a plurality of mobile devices and a mobile device that moves upon receiving a control signal from the controller. The mobile body control method includes causing the controller to transmit, to one of the plurality of mobile devices, a selection signal which indicates that the one mobile device is selected as a control target. The mobile body control method further includes causing the mobile device to confirm whether or not an own-device selecting signal which indicates that the own device is selected as a control target device has been received from the controller and, upon confirming reception of the own-device selecting signal, perform movement control to cause the own device to move in accordance with a selected-device identification track which indicates that the own device is selected as the control target device.

According to a fifth embodiment of the present disclosure, there is provided a program for causing a mobile device to perform mobile body control, the mobile device including a communication section that performs communication with a controller which selectively transmits control signals to a plurality of mobile devices and a data processing section that performs movement control of the own device. The program includes causing the data processing section to confirm whether or not an own-device selecting signal which indicates that the own device is selected as a control target device has been received from the controller, and causing the data processing section to, upon confirming reception of the own-device selecting signal, perform movement control to cause the own device to move in accordance with a selected-device identification track which indicates that the own device is selected as the control target device.

It is to be noted that the program according to the fifth embodiment of the present disclosure can be provided by a recording medium or communication medium for providing the program in a computer readable format to an information processing device or computer system that is capable of executing various program codes, for example. Since the program is provided in a computer readable format, processing in accordance with the program is executed on the information processing device or the computer system.

Other objects, features, and advantages of the present disclosure will become apparent from the detailed description based on the embodiment and the attached drawings which are described later. It is to be noted that, in the present description, a system refers to a logical set structure including a plurality of devices, and the devices of the structure are not necessarily included in the same casing.

According to the configuration of one embodiment according to the present disclosure, a user who is manipulating a controller is allowed to identify a control target device without taking the eyes off mobile devices such as drones.

Specifically, for example, the configuration includes a communication section that performs communication with a controller which selectively transmits control signals to a plurality of mobile devices, and a data processing section that performs movement control of the own device. The data processing section confirms whether or not an own-device selecting signal which indicates that the own device is selected as a control target device has been received from the controller, and causes, upon receiving the own-device selecting signal, the own device to move in accordance with a selected-device identification track which indicates that the own device is selected. For example, a drone starts flight in accordance with a selected-device identification track such as a forward/rearward horizontal flight track or a leftward/rightward horizontal flight track.

It is to be noted that the effects described in the present description are just examples, and thus, are not limited. In addition, other effects may be additionally provided.

BRIEF DESCRIPTION OF THE DRAWINGS

FIGS. 6A to 6C are diagrams for explaining examples of a selected-device identification track;

FIGS. 7A to 7C are diagrams for explaining further examples of the selected-device identification track;

FIGS. 8A to 8C are diagrams for explaining further examples of the selected-device identification track;

FIGS. 9A and 9B are diagrams for explaining further examples of the selected-device identification track;

FIG. 19 is a diagram for explaining another specific example of the enlargement/reduction parameter (scale value);

DETAILED DESCRIPTION OF THE PREFERRED EMBODIMENTS

Figure 1:
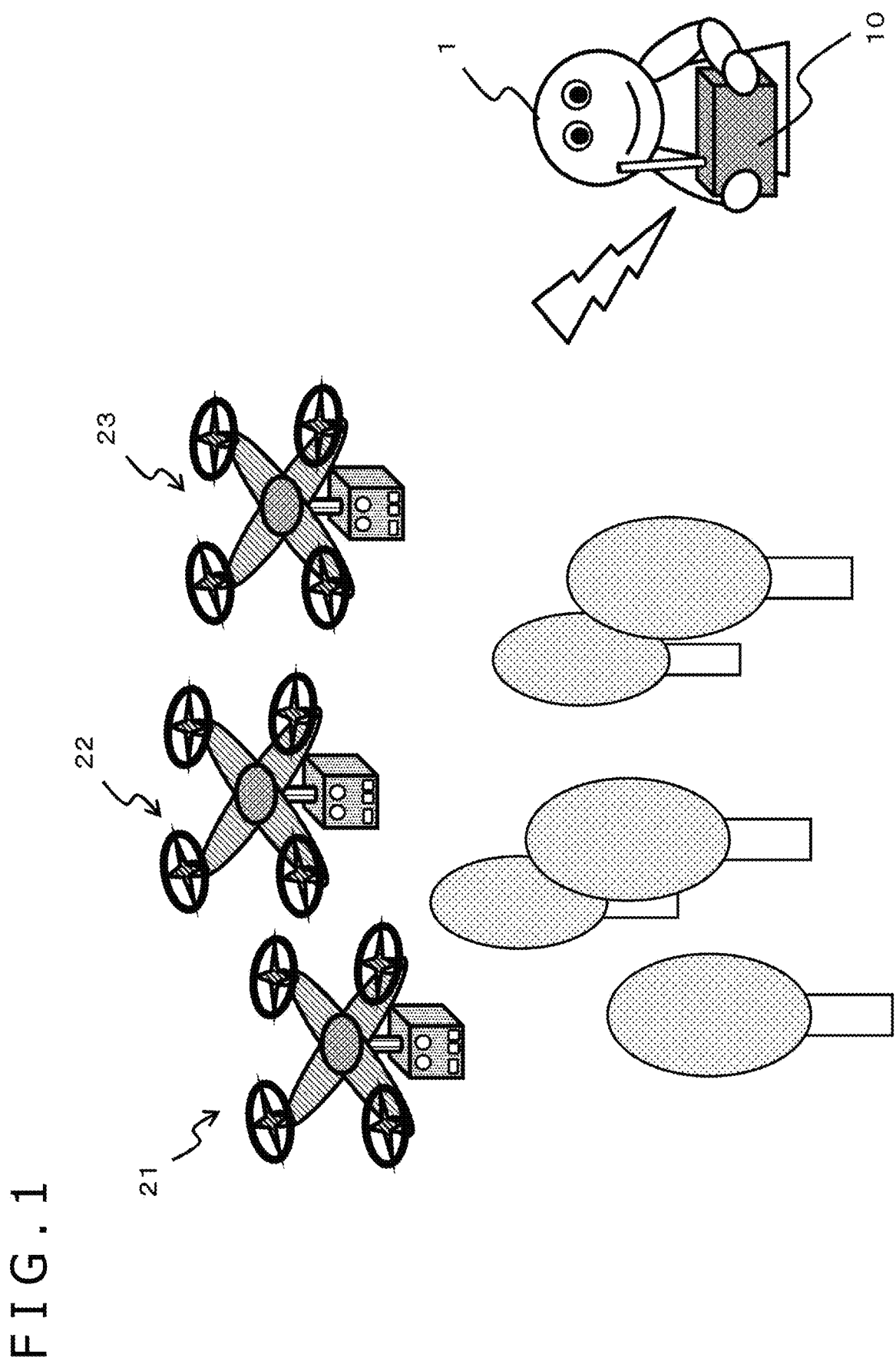
FIG. 1 is a diagram for explaining an outline of a configuration and processing according to an embodiment of the present disclosure.

Hereinafter, a mobile device, a mobile body control system, a mobile body control method, and a program according to embodiments of the present disclosure will be explained in detail with reference to the drawings. It is to be noted that the explanations will be given in accordance with the following order.
1. Outline of configuration and processing of movement control system according to embodiment of present disclosure
2. Configuration example of controller
3. Configuration example of communication between controller and drones
4. Specific examples of selected-device identification track for drone to indicate that drone is set as control target of controller
5. Flight control sequence which is executed by drone
5-(1) Basic process sequence for carrying out flight in accordance with selected-device identification track
5-(2a) Process sequence for carrying out flight in accordance with selected-device identification track in which user viewpoint is taken into consideration
5-(2b) Process sequence for carrying out flight in accordance with selected-device identification track in which user viewpoint and obstacle are taken into consideration
5-(3a) Process sequence for carrying out flight in accordance with selected-device identification track in which relative position (height) with respect to other drones is taken into consideration
5-(3b) Process sequence for carrying out flight in accordance with selected-device identification track in which relative position (distance to user) with respect to other drones is taken into consideration
6. Configuration example of mobile device and controller
7. Conclusion of configuration according to present disclosure

[1. Outline of Configuration and Processing of Movement Control System According to Embodiment of Present Disclosure]

First, the outline of a configuration and processing of a movement control system according to the embodiment of the present disclosure will be explained with reference to FIG. 1 and subsequent drawings.

FIG. 1 is a diagram depicting an entire configuration example of the movement control system according to the embodiment of the present disclosure. FIG. 1 depicts three drones including a drone-1 21, a drone-2 22, and a drone-3 23, a controller (remote control device) 10 that controls the drones, and a user 1 who is a drone manipulator who manipulates the controller 10.

Control such as flight control is performed on all the drone-1 21, the drone-2 22, and the drone-3 23 by means of the single controller 10 manipulated by the user (manipulator) 1.

It is to be noted that, in a case where each of the drones is equipped with a camera or the like, image photographing through the camera is also controlled by the controller 10.

The controller 10 has a function of switching a control target drone. That is, the controller 10 is capable of performing three types of settings including a first setting for setting the drone-1 21 as a control target, a second setting for setting the drone-2 22 as a control target, and a third setting for setting the drone-3 23 as a control target.

The controller 10 outputs a control signal having a frequency that varies according to the settings, for example. When each of the drones receives a control signal corresponding to a reception frequency allocated to the drone, the drone determines that the drone itself is a control target and performs various control, such as flight control or camera photographing control, based on the control signal.

Alternatively, instead of the above frequency switching, control signals having identifiers (ID), which are allocated to the respective drones, may be broadcasted. In this case, each of the drones may confirm the ID included in a received signal and determine that the drone itself is a control target when confirming that the received signal is a control signal having the ID allocated to the drone itself, so that the drone performs control based on the control signal.

The user 1 performs switching control on the three drones including the drone-1 21, the drone-2 22, and the drone-3 23 by using the single controller 10 in this manner.

However, in a case where switching control of a plurality of drones is performed by use of the single controller 10, it is difficult for the user (manipulator) holding the controller to identify a device number of a drone that is flying in a far distance even when device numbers are recorded on the respective drones, for example.

In this case, it is difficult for the user 1 to identify which one of the drone-1 21 to drone-3 23 in flight is a drone currently under control of the controller 10.

When this situation occurs, a drone may fall due to erroneous control.

According to the embodiment of the present disclosure, occurrence of such a situation is prevented, and the user 1 can identify a drone that is a control target of the controller 10 while watching drones in the sky.

It is to be noted that, in the embodiment, which will be explained hereinbelow, a control target of the controller is assumed as a drone. However, processing according to the present disclosure is applicable not only to the case where the control target of the controller is a drone but also to a case where there are a plurality of various control targets that are not drones.

For example, the configuration and processing according to the present disclosure are applicable to a case where a plurality of vehicles or a plurality of robots exists as control targets and switching control of the vehicles or robots is performed by means of a single controller.

[2. Configuration Example of Controller]

Next, a configuration example of a controller will be explained.

Figure 2:
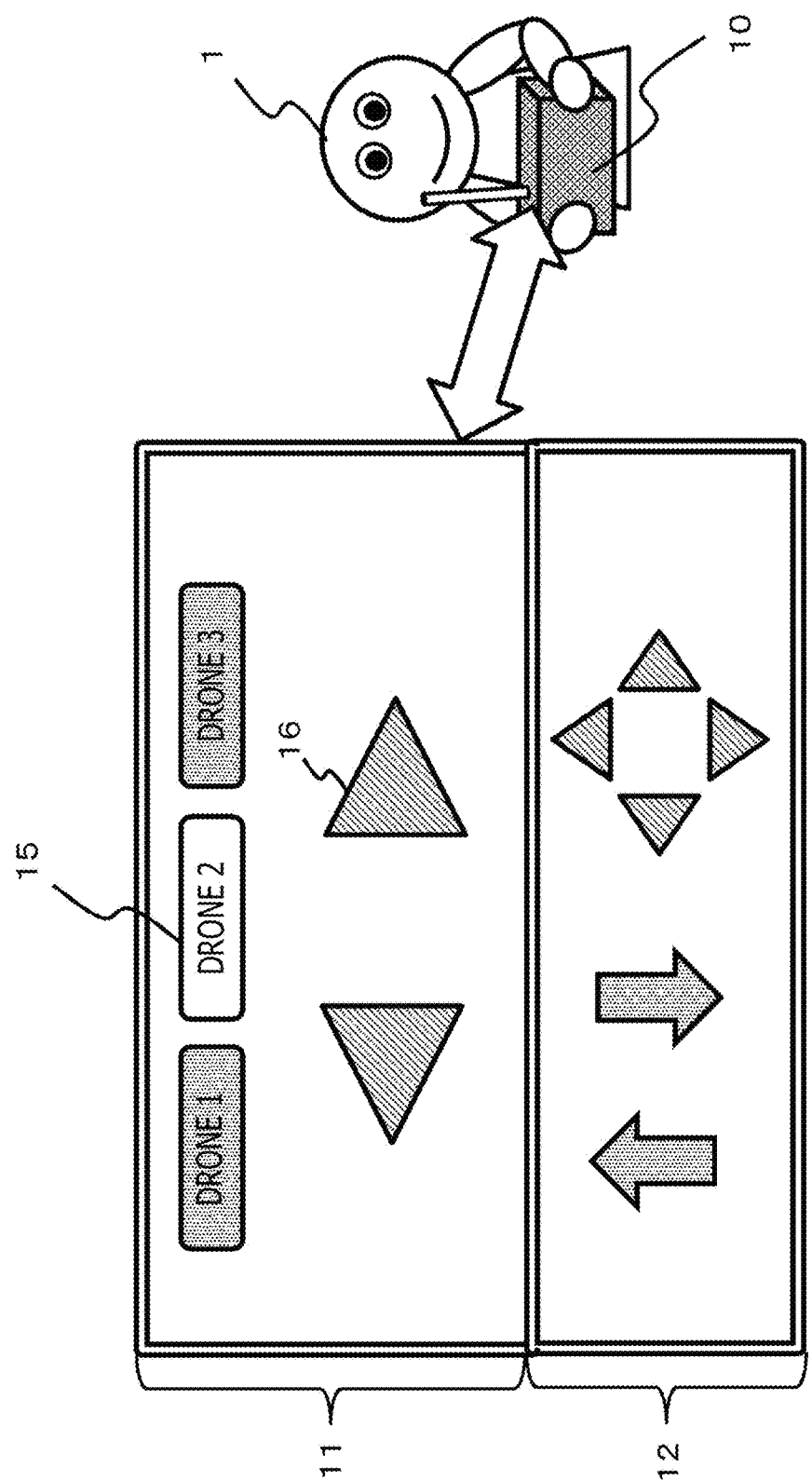
FIG. 2 is a diagram for explaining a configuration example of a controller (remote control device)

FIG. 2 is a diagram depicting one configuration example of the controller 10.

The controller 10 depicted in FIG. 2 includes a touch panel-type display section. A user performs a touch operation on various icons displayed on the display section of the controller 10, so that a process of switching a control target drone, a process of setting and transmitting a control signal to a control target drone, and the like can be performed.

As depicted in FIG. 2, a display data region includes a control-target drone selecting section 11 and a selected-drone control section 12.

The control-target drone selecting section 11 is a display region in which an operation for switching a control target drone of the controller 10 is performed.

The selected-drone control section 12 is a display region in which a control signal for performing control on a control target drone, such as flight control, is set and transmitted.

A control-target drone display section 15 and a control-target drone switching section 16 are displayed in the control-target drone selecting section 11.

In the example in FIG. 2, three icons [drone 1], [drone 2], and [drone 3] are displayed in the control-target drone display section 15, and only the icon [drone 2] is brightly displayed to indicate that the drone-2 22 is set as the current control target device of the controller 10.

In the control-target drone switching section 16, icons for switching a control target drone of the controller 10 are displayed. For example, when a user operates (touches) a triangular icon on the right side, the control target drone of the controller 10 is switched from the drone-2 22, which is the current control target, to the drone-3 23.

On the other hand, when the user operates (touches) a triangular icon on the left side, the control target drone of the controller 10 is switched from the drone-2 22, which is the current control target, to the drone-1 21.

In the configuration example depicted in FIG. 2, the controller 10 has the touch panel-type display section. However, the controller 10 is not limited to this configuration and can have various configurations.

Figure 3:
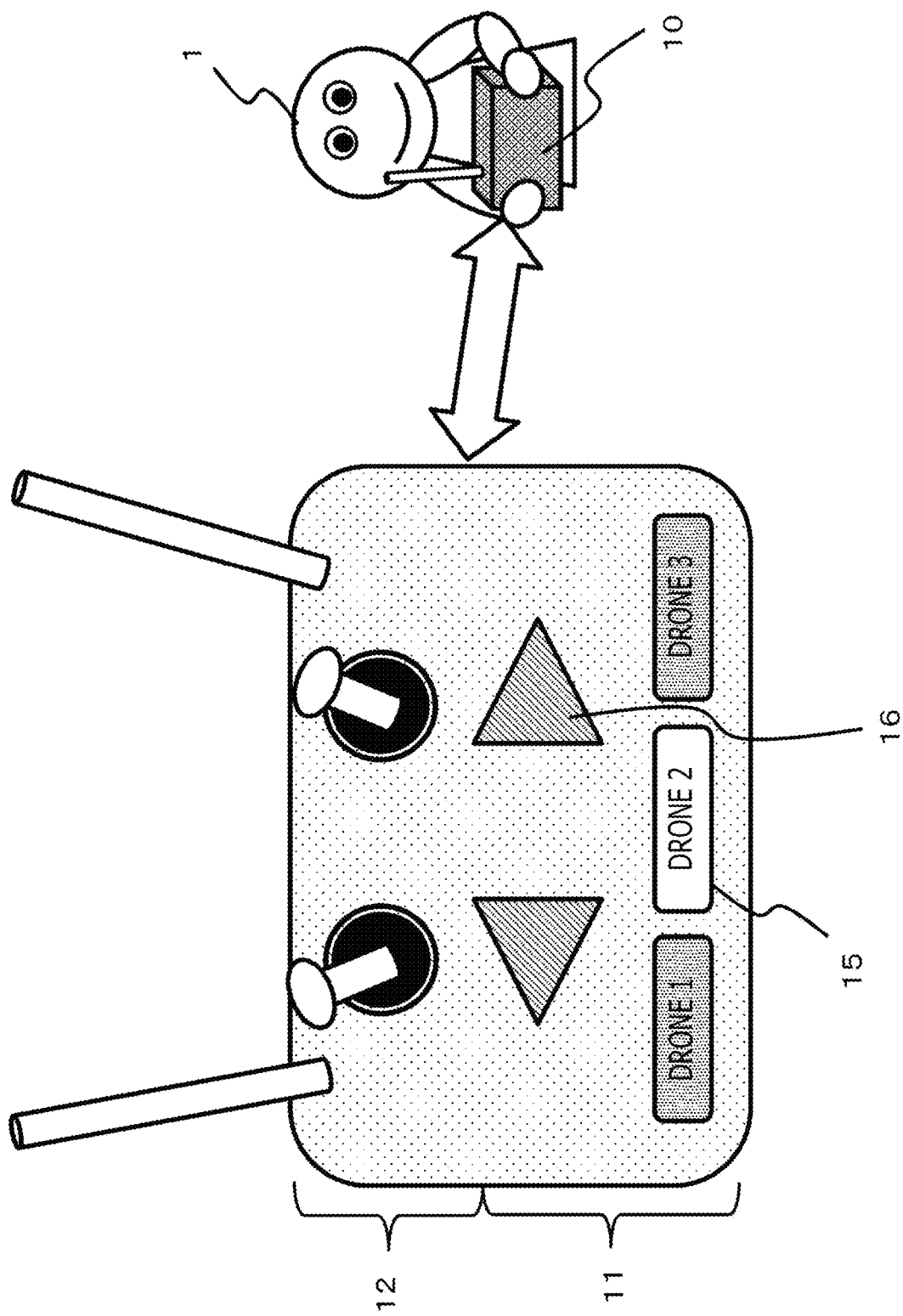
FIG. 3 is a diagram for explaining another configuration example of the controller (remote control device)

FIG. 3 is a diagram depicting one example of the controller 10 including no touch panel-type display section.

Similar to the controller explained above with reference to FIG. 2, the controller 10 depicted in FIG. 3 includes the control-target drone selecting section 11 and the selected-drone control section 12.

The control-target drone selecting section 11 is an operation region in which an operation for switching a control target drone of the controller 10 is performed.

The selected-drone control section 12 is an operation region for setting and transmitting a control signal to perform control on a control target drone such as flight control.

The control-target drone display section 15 and the control-target drone switching section 16 are provided in the control-target drone selecting section 11.

In the example in FIG. 3, three light emitting diode (LED) output sections [drone 1], [drone 2], and [drone 3] are provided in the control-target drone display section 15, and only the LED of [drone 2] is set ON and is brightly displayed. This indicates that the current control target device of the controller 10 is set to the drone-2 22.

Switches for switching a control target drone of the controller 10 are provided in the control-target drone switching section 16. For example, when a user operates (presses down) a triangular switch on the right side, a control target drone of the controller 10 is switched from the drone-2 22, which is the current control target, to the drone-3 23.

On the other hand, when the user operates (presses down) a triangular switch on the left side, the control target drone of the controller 10 is switched from the drone-2 22, which is the current control target, to the drone-1 21.

[3. Configuration Example of Communication Between Controller and Drones]

Next, a configuration example of communication between a controller and drones will be explained.

Figure 4:
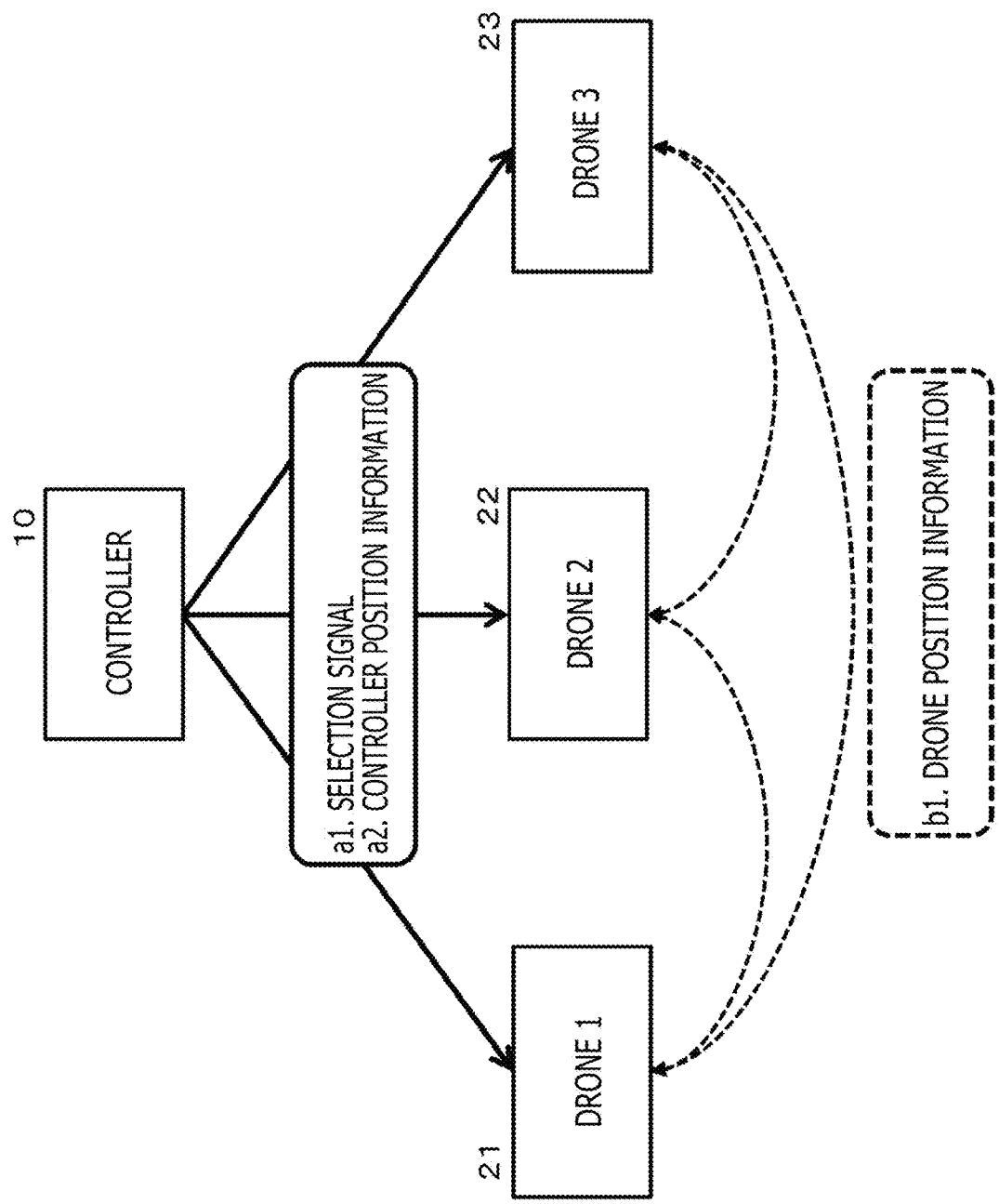
FIG. 4 is a diagram for explaining a configuration of communication between the controller and mobile devices (drones)

FIG. 4 is a diagram for explaining one configuration example of communication between a controller and drones.

In FIG. 4, solid line arrows each indicate a signal that is transmitted from the controller 10 to any of the drones 21 to 23, and dotted line arrows each indicate a signal that is exchanged among the drones.

Signals that are transmitted from the controller 10 to the drones 21 to 23 include the following two types of signals:

(a1) selection signal; and (a2) controller position information.

It is to be noted that signals that are transmitted from the controller 10 to the drones 21 to 23 also include a control signal for a drone. However, illustration of the control signal is omitted.

The (a1) selection signal indicates that the drone having received this signal is selected as a control target device of a control signal that is transmitted from the controller 10.

It is to be noted that a signal in any of various forms can be used as the selection signal. For example, an ID set for each of the drones can be used as the selection signal. Alternatively, a signal with a unique frequency set for each of the drones may be used as the selection signal.

The (a2) controller position information indicates the current position of the controller. For example, the (a2) controller position information is 3D position information, which is specifically position information including latitude information, longitude information, height information, etc.

The controller 10 includes an own-position information obtaining section such as an inertial measurement unit (IMU) or a global positioning system (GPS) and analyzes the own position of the controller 10 on the basis of information obtained by the own-position information obtaining section.

Both the (a1) selection signal and the (a2) controller position information are regularly transmitted from the controller 10 to a drone.

Meanwhile, signals that are exchanged among the drones as indicated by the dotted line arrows in FIG. 4 include:

(b1) drone position information.

The drones each fly while reporting the own device position information to one another.

The position information includes 3D position information, which is specifically position information including latitude information, longitude information, height information, etc.

Each of the drones also includes an own-position information obtaining section such as an IMU or a GPS and analyzes the own position of the drone on the basis of information obtained by the own-position information obtaining section.

This process of exchanging position information among the drones is also constantly executed during flight, so that the latest position information is constantly shared by the drones.

The communication configuration explained above with reference to FIG. 4 is one example, and other communication configurations may be adopted.

Figure 5:
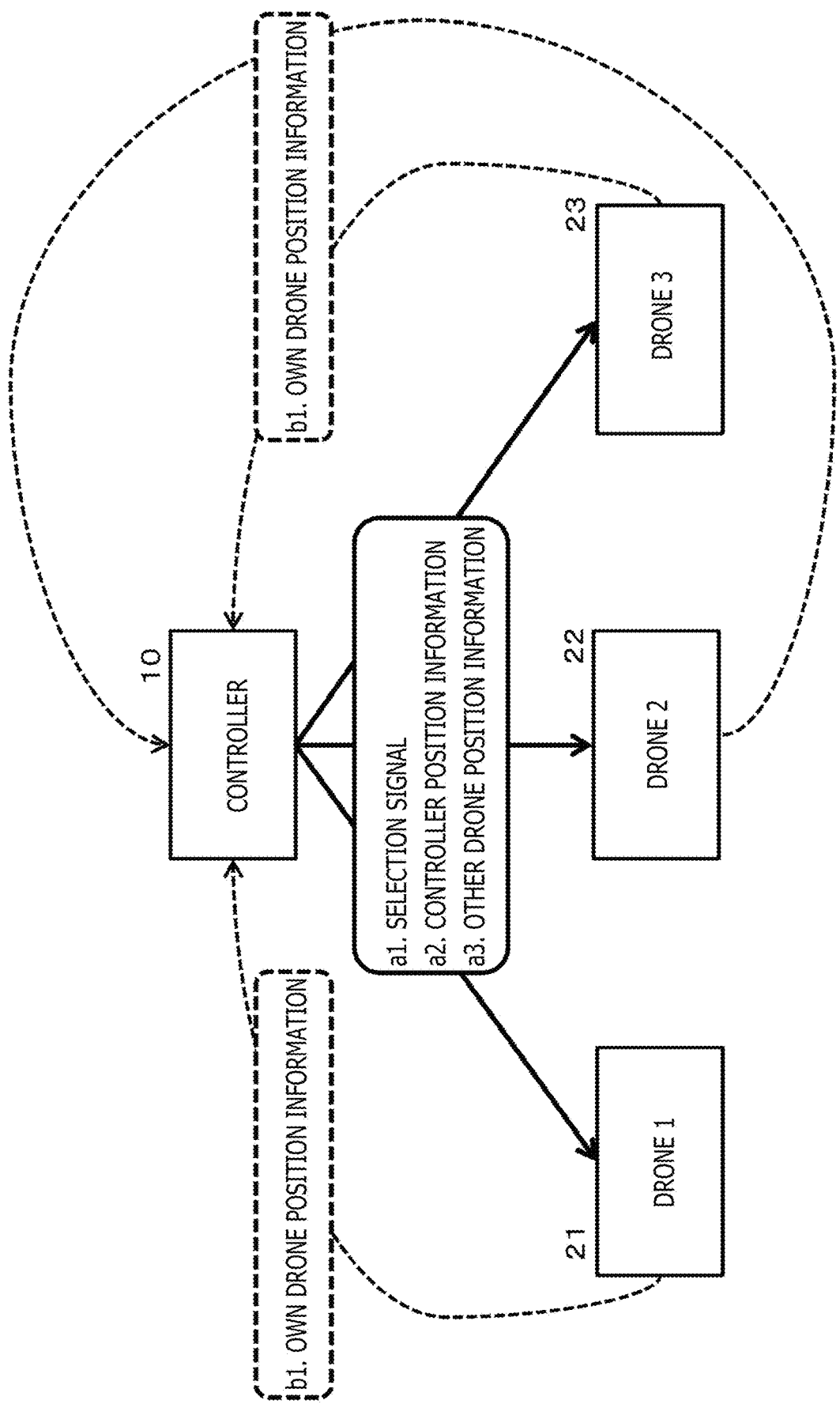
FIG. 5 is a diagram for explaining another configuration of the communication between the controller and the mobile devices (drones)

FIG. 5 depicts another communication configuration example.

In the communication configuration example in FIG. 5, communication among the drones is set not to be performed.

In FIG. 5, solid line arrows indicate signals that are transmitted from the controller 10 to the drones 21 to 23, and dotted line arrows indicate signals that are transmitted from the drones 21 to 23 to the controller 10.

The signals that are transmitted from the drones 21 to 23 to the controller 10 as indicated by the dotted line arrows in FIG. 5 include (b1) own drone position information.

The drones each obtain the own position and transmit the obtained own-device position information to the controller 10.

This position information is 3D position information, which is specifically position information including latitude information, longitude information, height information, etc. For example, position information obtained by use of an IMU or GPS signal or the like is used.

On the other hand, the signals that are transmitted from the controller 10 to the drones 21 to 23 include the following three types of signals:

(a1) selection signal;
(a2) controller position information; and
(a3) other drone position information.

It is to be noted that the signals that are transmitted from the controller 10 to the drones 21 to 23 include a control signal for a drone. However, illustration of the control signal is omitted.

The (a1) selection signal and the (a2) controller position information are identical to those explained above with reference to FIG. 4.

That is, the (a1) selection signal indicates that the drone having received this signal is selected as the control target device of a control signal that is transmitted from the controller 10.

The (a2) controller position information indicates the current position of the controller.

The (a3) other drone position information indicates the position of a drone other than the own device. This information is generated on the basis of the "(b1) own drone position information" which the controller 10 receives from the drones 21 to 23.

For example, the controller 10 generates, for each of the drones, a drone identifier and correspondence data on 3D position information regarding the drone and broadcasts data obtained by combining the drone identifier and the correspondence data.

Each of the drones obtains, from received data, correspondence data (drone ID and position information) other than position data associated with the ID of the own device, thereby to confirm the positions of the drones excluding the own device.

It is to be noted that the position information is 3D position information, which is specifically position information including latitude information, longitude information, height information, etc. For example, position information obtained by use of an IMU or GPS signal or the like is used.

Communication processes depicted in FIG. 5 are also constantly executed during flight of the drones, so that the latest position information is constantly shared by the controller and the drones.

[4. Specific Examples of Selected-Device Identification Track for Drone to Indicate that Drone is Set as Control Target of Controller]

Next, specific examples of a selected-device identification track for a drone to indicate that the drone is set as a control target of a controller will be explained.

In the configuration according to the embodiment of the present disclosure, the controller 10 performs switching control of a plurality of drones.

As explained above, with this control configuration, it is difficult, in some cases, for the user 1 to identify which one of a plurality of drones in the sky is the control target drone of the controller 10. When this situation occurs, a drone may fall due to erroneous control.

According to the embodiment of the present disclosure, occurrence of such a situation is prevented, and the user 1 can identify a control target drone of the controller 10 while watching drones in the sky.

In the configuration according to the embodiment of the present disclosure, in order to make a control target drone identifiable, when one drone is selected as a control target of the controller 10, the drone selected as the control target carries out special flight for indicating that the drone is selected as the control target, that is, flight in accordance with a "selected-device identification track."

The user 1, on the ground, manipulating the controller 10 confirms that one of a plurality of drones in the sky carries out special flight, that is, flight in accordance with a "selected-device identification track," so that the user 1 can confirm that the one drone carrying out the flight in accordance with the "selected-device identification track" is a drone selected as the control target of the controller 10.

When performing this confirmation process, the user 1, who is a manipulator of the controller 10, does not need to look at the controller 10. That is, while continuously observing the drones in the sky, the user 1 can assuredly confirm which drone is selected as the control target. Accordingly, the user 1 can perform a confirmation operation without taking the eyes off the drones.

Specific examples of special flight to be carried out by a drone that is selected as a control target of the controller 10, that is, flight in accordance with a "selected-device identification track" will be explained with reference to FIGS. 6A to 9B.

It is to be noted that, hereinafter, a plurality of different examples of the "selected-device identification track" will be explained, but it is actually sufficient if setting for carrying out flight in accordance with any one of tracks included in these examples is performed.

However, the user 1 who is a manipulator of the controller 10 may need to grasp one selected flight form of the "selected-device identification track."

Examples of the "selected-device identification track" will be explained with reference to FIGS. 6A to 9B.

FIGS. 6A to 6C depict three examples of the "selected-device identification track."

FIG. 6A: (1) Selected-device identification track example 1=Forward/rearward horizontal flight FIG. 6B: (2) Selected-device identification track example 2=Leftward/rightward horizontal flight FIG. 6C: (3) Selected-device identification track example 3=Upward/downward vertical flight (1) Selected-Device Identification Track Example 1=Forward/Rearward Horizontal Flight In the selected-device identification track example 1, when a drone having received a selection signal for the drone itself from the controller 10 that is being manipulated by the user 1 confirms the fact that the drone is selected as a control target from the received selection signal, the drone carries out forward/rearward horizontal flight to make the user 1, who is manipulating the controller 10, know that the drone is a device (drone) selected as the control target device.

When the user 1 watching a plurality of drones in the sky sees a drone start forward/rearward horizontal flight, the user 1 can assuredly confirm that the drone is the current control target drone of the controller 10.

(2) Selected-Device Identification Track Example 2=Leftward/Rightward Horizontal Flight In the selected-device identification track example 2, when a drone is selected as a control target by a selection signal from the controller 10, the drone carries out leftward/rightward horizontal flight to make the user 1 know that the drone is a device (drone) selected as the control target device.

By seeing the drone start leftward/rightward horizontal flight, the user 1 can assuredly confirm that the drone is the current control target drone of the controller 10.

(3) Selected-Device Identification Track Example 3=Upward/Downward Vertical Flight In the selected-device identification track example 3, when a drone is selected as a control target by a selection signal from the controller 10, the drone carries out upward/downward vertical flight to make the user 1 know that the drone is a device (drone) selected as the control target device.

By seeing the drone start upward/downward vertical flight, the user 1 can assuredly confirm that the drone is the current control target drone of the controller 10.

FIGS. 7A to 7C depict the following three examples of the "selected-device identification track."

FIG. 7A: (4) Selected-device identification track example 4=Horizontally rotating flight FIG. 7B: (5) Selected-device identification track example 5=Vertically rotating flight FIG. 7C: (6) Selected-device identification track example 6=Triangular flight In each of (4) selected-device identification track example 4 to (6) selected-device identification track example 6, when a drone is selected as a control target by a selection signal from the controller 10, the drone carries out "horizontally rotating flight," "vertically rotating flight," or "triangular flight" to make the user 1 know that the drone is a device (drone) selected as the control target device.

By seeing the drone start "horizontally rotating flight," "vertically rotating flight," or "triangular flight," the user 1 can assuredly confirm that the drone is the current control target drone of the controller 10.

FIGS. 8A to 8C depict the following three examples of the "selected-device identification track."

FIG. 8A: (7) Selected-device identification track example 7=Circular flight

FIG. 8B: (8) Selected-device identification track example 8=User-specified shape flight (flight having a star-shaped track is depicted)

FIG. 8C: (9) Selected-device identification track example 9=Swing flight

In each of (7) selected-device identification track example 7 to (9) selected-device identification track example 9, when a drone is selected as a control target by a selection signal from the controller 10, the drone carries out "circular flight," "user-specified shape flight," or "swing flight" to make the user 1 know that the drone is a device (drone) selected as the control target device.

By seeing the drone start "circular flight," "user-specified shape flight," or "swing flight," the user 1 can assuredly confirm that the drone is the current control target drone of the controller 10.

FIGS. 9A and 9B depict the following two examples of the "selected-device identification track."

FIG. 9A: (10) Selected-device identification track example 10=Tilted flight

FIG. 9B: (11) Selected-device identification track example 11=Vertically-inverted flight In each of (10) selected-device identification track example 10 and (11) selected-device identification track example 11, when a drone is selected as a control target by a selection signal from the controller 10, the drone carries out "tilted flight" or "vertically-inverted flight" to make the user 1 know that the drone is a device (drone) selected as the control target device.

By seeing the drone start "tilted flight" or "vertically-inverted flight," the user 1 can assuredly confirm that the drone is the current control target drone of the controller 10.

The eleven examples of the selected-device identification track have been explained with reference to FIGS. 6A to 9B.

The eleven examples of the selected-device identification track explained above with reference to FIGS. 6A to 9B each represent a flight example in which a user viewpoint is not taken into consideration. In some cases, depending on the viewpoint position of the user, whether or not flight in accordance with a selected-device identification track is being carried out is difficult to discern.

This problem is solved by examples of the "selected-device identification track," which will be explained with reference to FIGS. 10 to 14. In these examples of the selected-device identification track, the viewpoint of the user 1 who is manipulating the controller 10 is taken into consideration.

Figure 10:
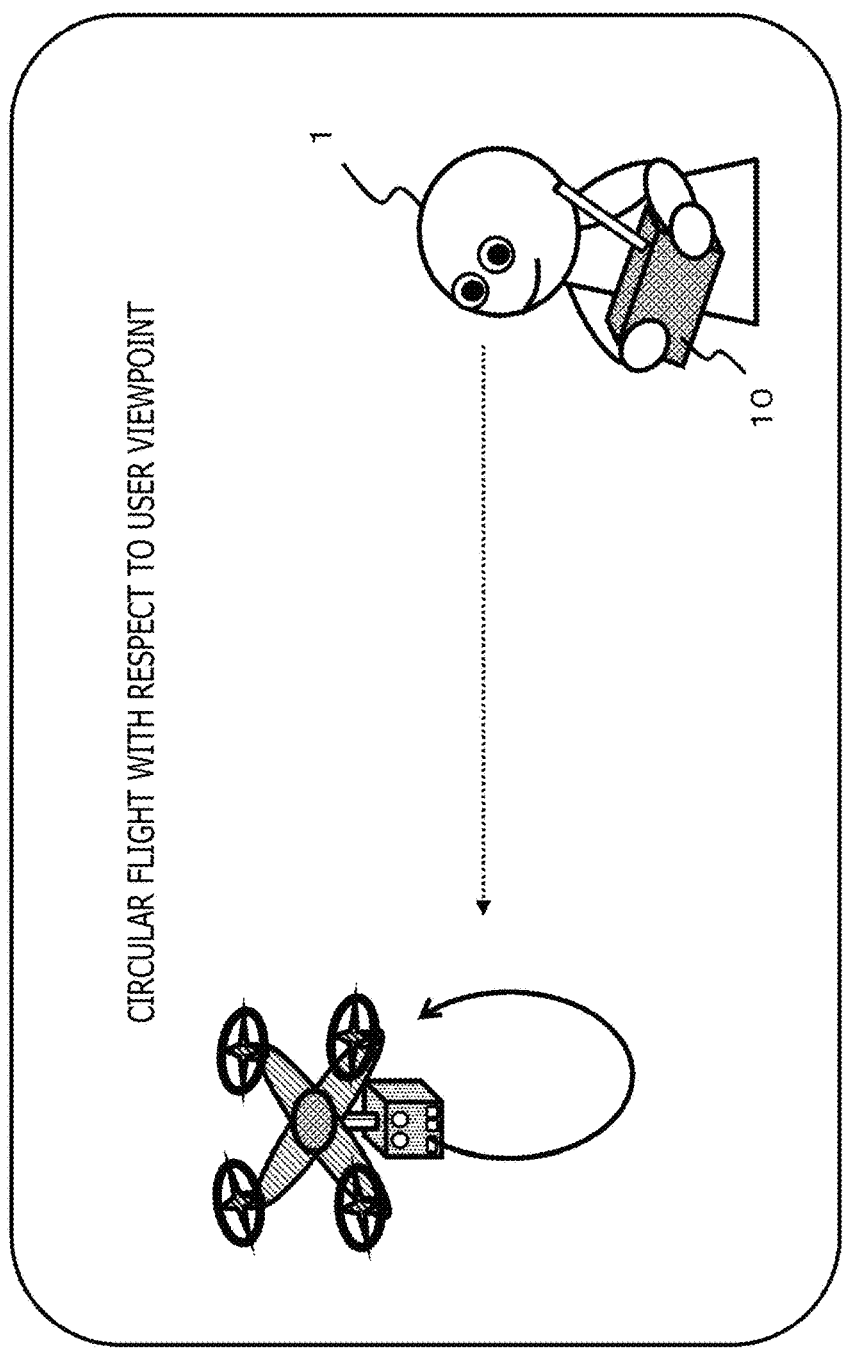
FIG. 10 is a diagram for explaining a further example of the selected-device identification track.

FIG. 10 depicts the following example of the "selected-device identification track."

(U1) Selected-device identification track example U1 in which the user viewpoint is taken into consideration=Circular flight with respect to the user viewpoint In the example of the "selected-device identification track" depicted in FIG. 10, the "selected-device identification track" is set to have a circular track in a plane that is substantially orthogonal to a viewpoint direction of the user 1.

When a drone carries out flight in accordance with such a track, the user 1 can assuredly observe the drone flying in accordance with the circular track in a plane that is substantially orthogonal to the viewpoint direction of the user 1. That is, the drone flying in accordance with the selected-device identification track can be assuredly discerned as the control target drone.

It is to be noted that, in a case where a distance between the user 1 and a drone is long, even when flight in accordance with the selected-device identification track set in a plane that is substantially orthogonal to the viewpoint direction of the user 1 is carried out, if the size of a circle that is drawn along the track is small, whether or not the flight in accordance with the "selected-device identification track" is being carried out is considered to be difficult to determine in some cases.

Figure 11A:
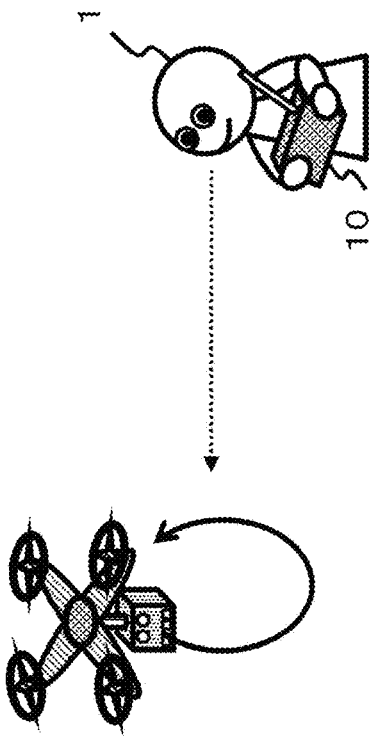
FIGS. 11A and 11B are diagrams for explaining further examples of the selected-device identification track.
Figure 11B:
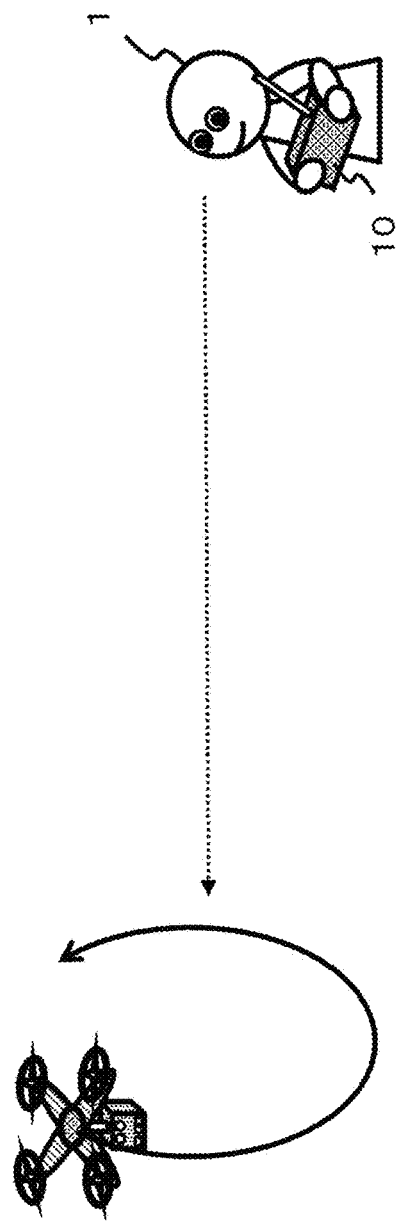

Accordingly, as depicted in FIGS. 11A and 11B, while a distance between a position of the user 1 who is manipulating the controller 10 (=a position of the controller 10) and a position of the drone is taken into consideration, the size of a circular track as the "selected-device identification track" is changed.

FIG. 11A depicts a case (U1-a) where the distance between the position of the user 1 who is manipulating the controller 10 (=the position of the controller 10) and the position of the drone is short.

FIG. 11B depicts a case (U1-b) where the distance between the position of the user 1 who is manipulating the controller 10 (=the position of the controller 10) and the position of the drone is long.

As depicted in (U1-a) of FIG. 11A, in a short-distance case in which the distance between the position of the user 1 (=the position of the controller 10) and the position of the drone is short, the size of a circular track as the "selected-device identification track" is set to be small.

On the other hand, as depicted in (U1-b) of FIG. 11B, in a long-distance case in which the distance between the position of the user 1 (=the position of the controller 10) and the position of the drone is long, the size of a circular track as the "selected-device identification track" is set to be large.

The size of the track is changed according to the distance to the user 1 as described above, so that the user 1 can assuredly discern a drone that is flying in accordance with the "selected-device identification track."

However, in a case where the drone flies in accordance with the "selected-device identification track," when the position of the track of the flight is invisible to the user 1, for example, when the position is shielded by an obstacle, it is difficult for the user 1 to confirm the drone that is flying in accordance with the "selected-device identification track."

Figure 12:
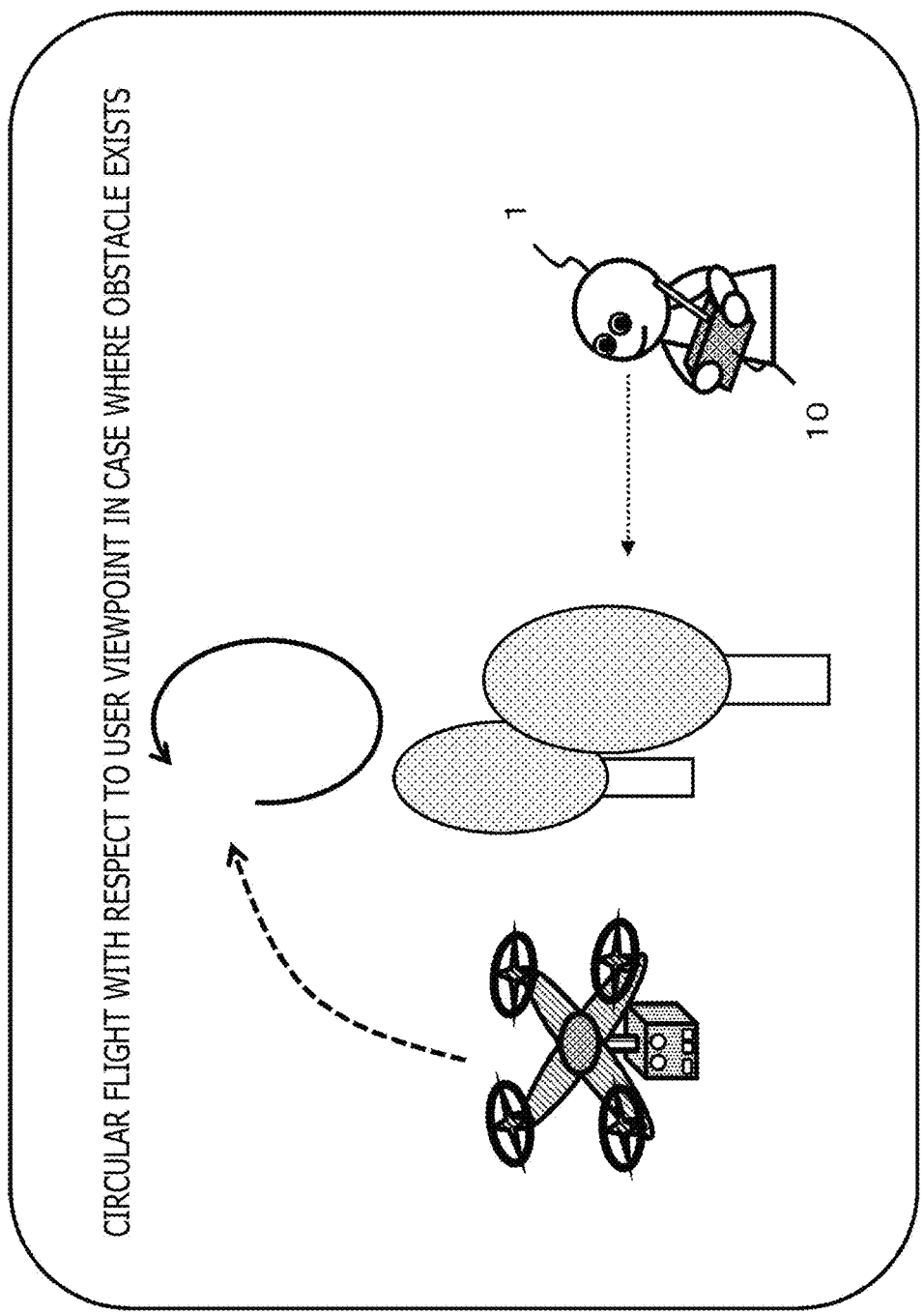
FIG. 12 is a diagram for explaining a further example of the selected-device identification track.

In such a case, the drone moves to a position visible to the user 1 and then flies in accordance with the "selected-device identification track" as depicted in FIG. 12. FIG. 12 depicts a case (U1-c) where there exists an obstacle between the position of the user 1 who is manipulating the controller 10 (=the position of the controller 10) and the position of the drone.

It is to be noted that, in order to execute this process, the drone may need to analyze the position of the user 1 (=the position of the controller 10) and a position of an obstacle.

In order to execute this process, the drone receives controller position information from the controller 10, generates a 3D map of a 3D space along a flight route, analyzes the 3D map, and analyzes a 3D position of the obstacle.

It is to be noted that a specific process sequence of the process and a detailed configuration of the 3D map to be used will be explained later.

Furthermore, an example of the "selected-device identification track" in which a relative positional relation with other drones is taken into consideration will be explained with reference to FIG. 13.

Figure 13:
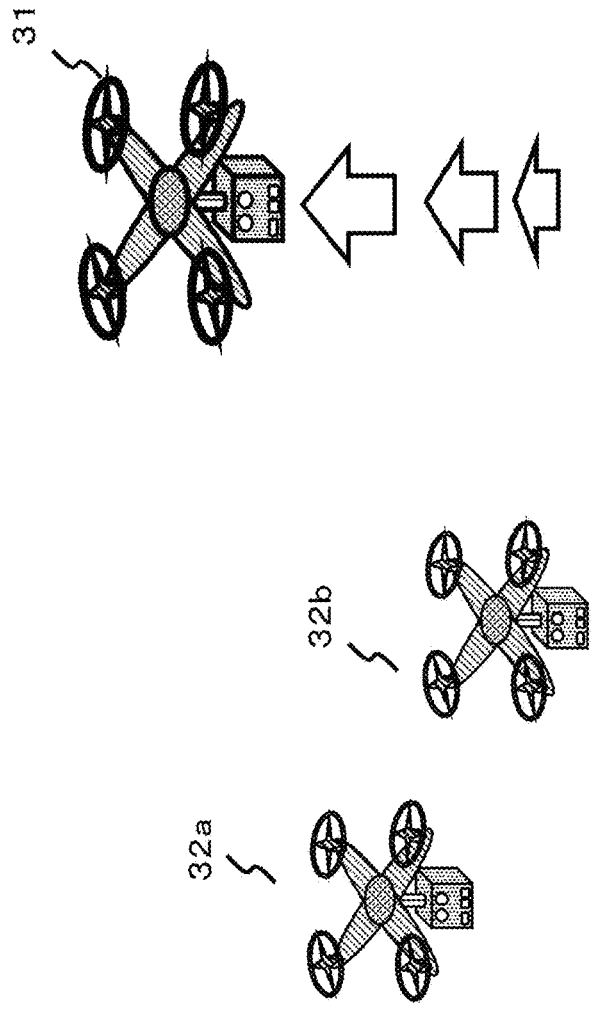
FIG. 13 is a diagram for explaining a further example of the selected-device identification track.

FIG. 13 depicts a case (D1) where a selected drone 31 that is selected as a control target by a selection signal from the controller 10 carries out flight to move upward to a position higher than other non-selected drones 32a and 32b in order to make the user 1 know that the drone is a device (drone) selected as a control target device.

The user 1 who is observing drones while manipulating the controller 10 can confirm, by seeing a drone start to move upward to a highest position among the flying drones, that the drone at the highest position is the current control target drone of the controller 10.

Another example of the "selected-device identification track" in which a relative positional relation with other drones is taken into consideration will be explained with reference to FIG. 14.

Figure 14:
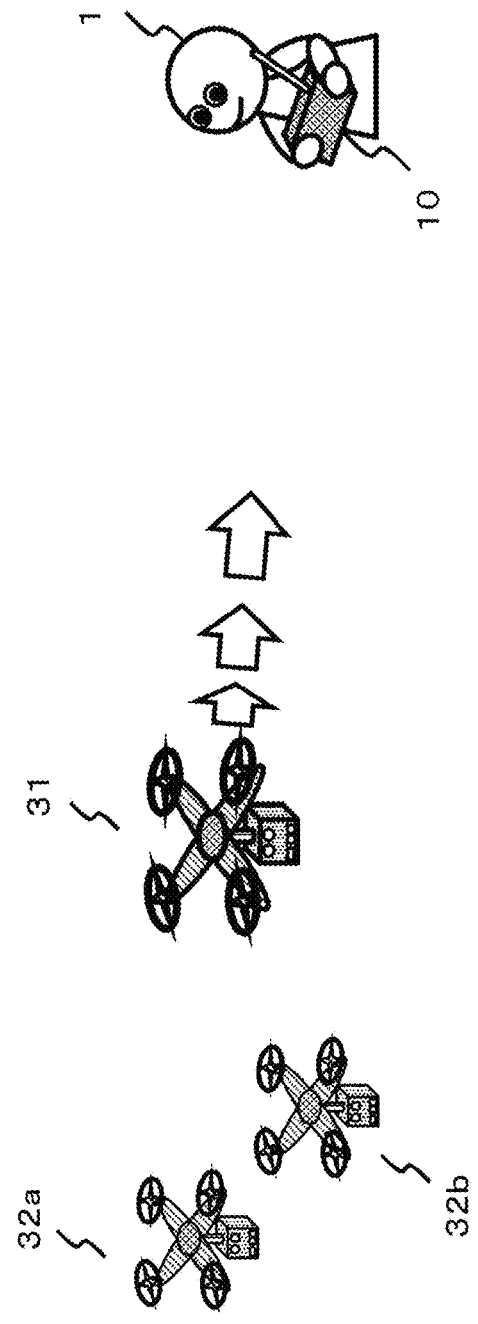
FIG. 14 is a diagram for explaining a further example of the selected-device identification track.

FIG. 14 depicts a case (D2) where the selected drone 31 that is selected as the control target by a selection signal from the controller 10 carries out flight to move to a position closer to the position of the user 1 (=the position of the controller 10) than the other non-selected drones 32a and 32b in order to make the user 1 know that the drone is a device (drone) selected as the control target device.

The user 1 observing drones while manipulating the controller 10 can confirm, by seeing a drone start flight to approach the position of the user 1 and reach a position closest, of those of flying drones, to the position of the user 1, that the drone at the closest position is the current control target drone of the controller 10.

A plurality of different examples of the "selected-device identification track" have been explained with reference to FIGS. 6A to 14.

The flight in accordance with the plurality of different "selected-device identification tracks" can be separately carried out, but the flight in accordance with the plurality of "selected-device identification tracks" may be carried out in combination.

It is to be noted that, in order to carry out flight in accordance with these various "selected-device identification tracks," a drone may need to confirm a signal transmitted from the controller 10, for example, a selection signal which indicates that the drone is selected as the control target. In addition, in some cases, a process of confirming controller position information and positions of other drones may be needed depending on the flight form.

Specific process sequences which are executed by a drone that carries out flight in accordance with these various "selected-device identification tracks" will be explained in the next item.

[5. Flight Control Sequence which is Executed by Drone]

Next, a flight control sequence which is executed by a drone will be explained.

Hereinafter, a plurality of flight control sequences which are each executed by a drone will be explained in order.

(1) Basic process sequence for carrying out flight in accordance with a selected-device identification track (2a) Process sequence for carrying out flight in accordance with a selected-device identification track in which a user viewpoint is taken into consideration (2b) Process sequence for carrying out flight in accordance with a selected-device identification track in which a user viewpoint and an obstacle are taken into consideration (3a) Process sequence for carrying out flight in accordance with a selected-device identification track in which a relative position (height) with respect to other drones is taken into consideration (3b) Process sequence for carrying out flight in accordance with a selected-device identification track in which a relative position (distance to a user) with respect to other drones is taken into consideration

[5-(1) Basic Process Sequence for Carrying Out Flight in Accordance with Selected-Device Identification Track]

First, the "(1) basic process sequence for carrying out flight in accordance with a selected-device identification track" will be explained.

Figure 15:
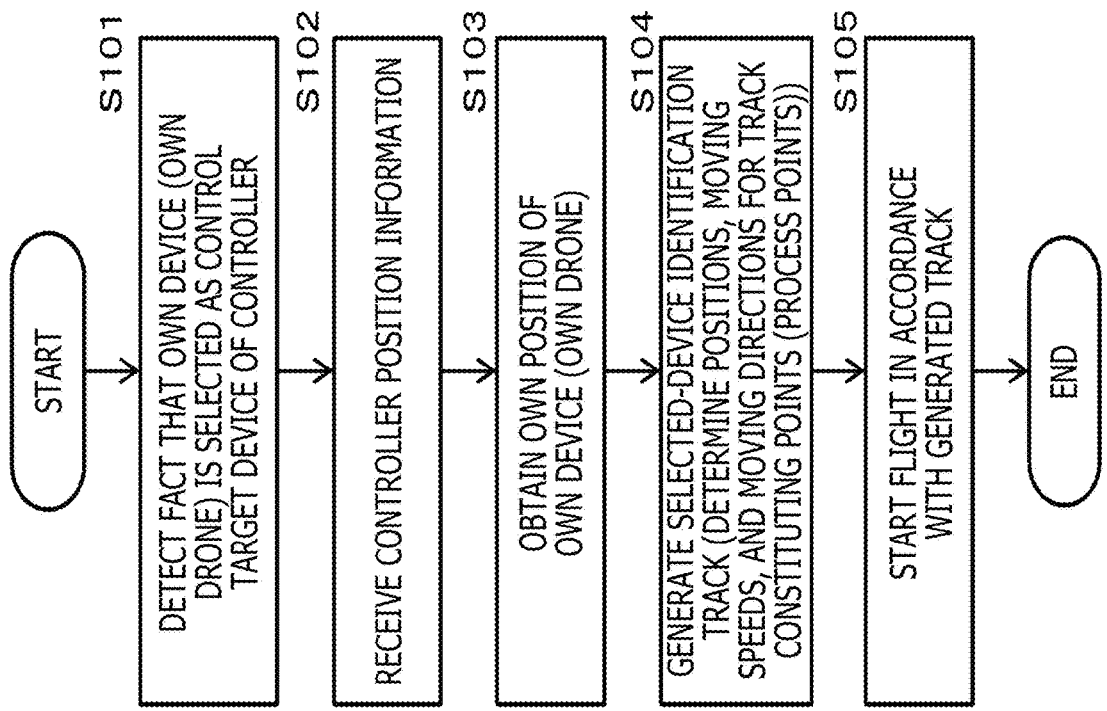
FIG. 15 is a diagram depicting a flowchart of a process sequence which is executed by a mobile device (drone)

The basic process sequence for carrying out flight in accordance with a selected-device identification track will be explained with reference to a flowchart in FIG. 15.

It is to be noted that the steps in the flowcharts in FIGS. 15, 17, 20, 21, 26, and 27 can be executed in accordance with a program stored in an internal memory of an information processing device installed in a drone and under control of a control section (data processing section) that includes a central processing unit (CPU) or the like having a function of executing the program in the information processing device.

First, steps in the flow in FIG. 15 will be explained in order.

(Step S101)

First, at step S101, the data processing section of the drone detects the fact that the own device (own drone) is selected as a control target device of the controller.

As explained above with reference to FIGS. 4 and 5, the controller 10 transmits a selection signal to each of drones.

The selection signal indicates that the drone is selected as a control target device of a control signal that is transmitted from the controller 10.

It is to be noted that, as explained above, a signal in any of various forms can be used as the selection signal. For example, an ID set to each of drones can be used as the selection signal. Alternatively, a signal with a unique frequency set to each of drones may be used as the selection signal.

At step S101, the drone analyzes the selection signal included in signals transmitted from the controller 10 and detects the fact that the own device (own drone) is selected as the control target.

(Step S102)

Next, at step S102, the drone having detected the fact that the own device (own drone) is selected as the control target receives controller position information.

As explained above with reference to FIGS. 4 and 5, the controller 10 transmits controller position information (3D position information) to drones as occasion demands, and the drone receives the transmitted position information and confirms the 3D position of the controller 10.

(Step S103)

Next, at step S103, the drone obtains the own position of the own device (own drone).

The drone includes an own-position information obtaining section such as an IMU or a GPS and obtains the current own position (3D position) of the drone on the basis of information obtained by the own-position information obtaining section.

(Step S104)

Next, at step S104, the drone generates a selected-device identification track.

Specifically, a process of generating the selected-device identification track is executed to determine positions, moving speeds, and moving directions for respective track constituting points (process points).

A specific example of the selected-device identification track generating process, which is executed at step S104, will be explained with reference to FIG. 16.

Figure 16:
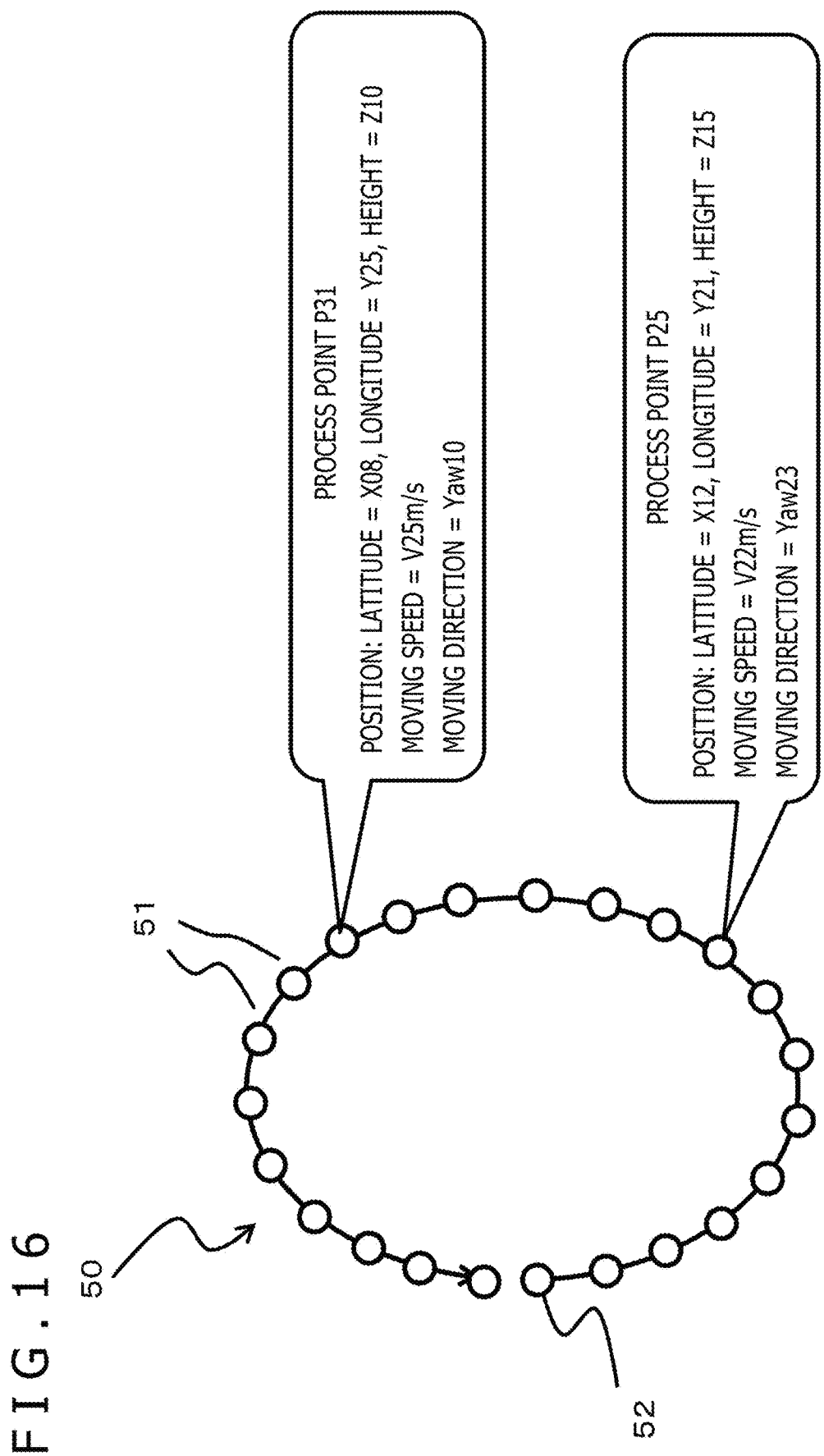
FIG. 16 is a diagram for explaining a track generation example.

FIG. 16 depicts a circular track 50 as one example of the selected-device identification track.

Multiple process points 51 constitute the track 50. Step S104 is executed to determine a position (3D position), a moving speed, and a moving direction for each of the process points 51.

One process point to be processed first is defined as a start point 52. From the position of the start point, positions (3D positions), moving speeds, and moving directions are determined for all the process points on the track 50. Accordingly, one selected-device identification track is generated.

FIG. 16 illustrates positions (3D positions), moving speeds, and moving directions for two process points P25 and P31 as examples.

The process point P25 is set as a selected-device identification track constituting point having a position (3D position), a moving speed, and a moving direction as follows.
Position: latitude=X12, longitude=Y21, height=Z15
Moving speed=V22 m/s
Moving direction=Yaw23

The process point P31 is set as a selected-device identification track constituting point having a position (3D position), a moving speed, and a moving direction as follows.
Position: latitude=X08, longitude=Y25, height=Z10
Moving speed=V25 m/s
Moving direction=Yaw10

The data processing section of the drone generates one selected-device identification track by executing a process of determining the positions (3D positions), the moving speeds, and the moving directions for all the process points on the track 50 from the start point 52.

It is to be noted that the process points set in FIG. 16 are depicted at intervals for easy understanding. However, in the actual track generating process, the process points are densely set on the track 50, and the process of determining the positions (3D positions), the moving speeds, and the moving directions for all the process points is executed, thereby to generate one selected-device identification track.

(Step S105)

Finally, at step S105, the drone starts flight in accordance with the selected-device identification track generated at step S104.

By seeing one of drones that are flying in the sky start flight in accordance with the selected-device identification track, the user can confirm that the drone is a drone selected as the current control target of the controller 10.

[5-(2a) Process Sequence for Carrying Out Flight in Accordance with Selected-Device Identification Track in which User Viewpoint is Taken into Consideration]

Next, (2a) process sequence for carrying out flight in accordance with a selected-device identification track in which a user viewpoint is taken into consideration will be explained.

The process sequence for carrying out flight in accordance with a selected-device identification track in which a user viewpoint is taken into consideration will be explained with reference to a flowchart in FIG. 17.

This process sequence corresponds to that for a case where flight in accordance with the selected-device identification track, which has been explained with reference to FIGS. 11A and 11B, is carried out. That is, this is a process of changing the size of a circular track as a "selected-device identification track" while taking the distance between the position of the user 1 who is manipulating the controller 10 (=the position of the controller 10) and the position of the drone into consideration as depicted in FIGS. 11A and 11B.

It is to be noted that a flow, which will be explained below, indicates a sequence for adjusting not only the size of a track but also a speed.

Steps in the flow in FIG. 17 will be explained in order.

(Step S201)

First, at step S201, the data processing section of a drone detects the fact that the own device (own drone) is selected as the control target device of the controller.

As explained above with reference to FIGS. 4 and 5, the controller 10 transmits a selection signal to each of drones. The selection signal indicates that the drone is selected as a control target device of a control signal that is transmitted from the controller 10.

It is to be noted that, as explained above, a signal in any of various forms can be used as the selection signal. For example, an ID set to each of drones can be used as the selection signal. Alternatively, a signal with a unique frequency set to each of drones may be used as the selection signal.

At step S201, the drone analyzes the selection signal included in signals transmitted from the controller 10 and detects the fact that the own device (own drone) is selected as the control target.

(Step S202)

Next, at step S202, the drone having detected the fact that the own device (own drone) is selected as the control target receives controller position information.

As explained above with reference to FIGS. 4 and 5, the controller 10 transmits controller position information (3D position information) to the drone as occasion demands, and the drone receives the transmitted position information and confirms the 3D position of the controller.

(Step S203)

Next, at step S203, the drone obtains the own position of the own device (own drone).

The drone includes an own-position information obtaining section such as an IMU or a GPS and obtains the current own position (3D position) of the drone on the basis of information obtained by the own-position information obtaining section.

(Step S204)

Next, at step S204, the drone generates a selected-device identification track.

Specifically, a process of generating the selected-device identification track is executed to determine positions, moving speeds, and moving directions for respective track constituting points (process points).

This process is similar to that explained above with reference to FIG. 16.

The determined track and the determined speed at each of track constituting points on the determined track, which are generated at step S204, are set as a "reference track" and a "reference speed," respectively.

(Step S205)

Next, at step S205, the data processing section of the drone calculates the distance between the own device (own drone) and the controller.

The distance can be calculated on the basis of the position of the controller obtained at step S202 and the position of the own device (own drone) obtained at step S203.

(Step S206)

Next, at step S206, the data processing section of the drone calculates or obtains an enlargement/reduction parameter (scale value) according to the distance between the own device (own drone) and the controller.

The reference track generated at step S204 is a track that is used in a case where the distance between the user and the drone is equal to a prescribed reference distance (Ls), that is, is a reference "selected-device identification track."

The "selected-device identification track" according to the reference distance (Ls) and the enlargement/reduction parameter (scale value) according to the distance between the own device (own drone) and the controller will be explained in detail with reference to FIGS. 18A and 18B.

Figure 18A:
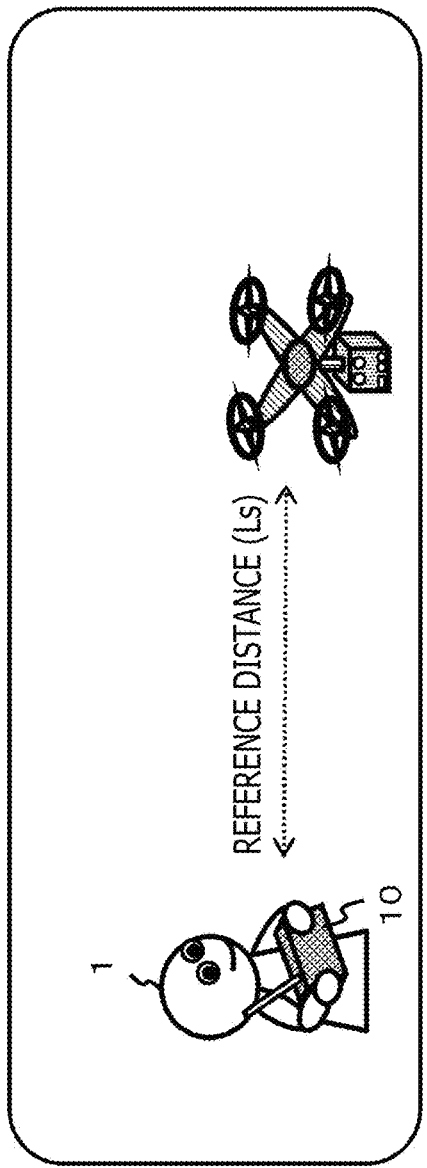
FIGS. 18A and 18B are diagrams for explaining a specific example of an enlargement/reduction parameter (scale value)

FIG. 18A depicts an example of the "selected-device identification track" according to the reference distance (Ls). The "selected-device identification track" according to the reference distance (Ls) is the reference track generated at step S204. For each of the track constituting points (process points), a moving speed and a moving direction are specified.

It is to be noted that the moving speeds of the respective reference track constituting points (process points) are set to be different from one another. The moving speed of each of the reference track constituting points (process points) is defined as the reference speed.

Figure 18B:
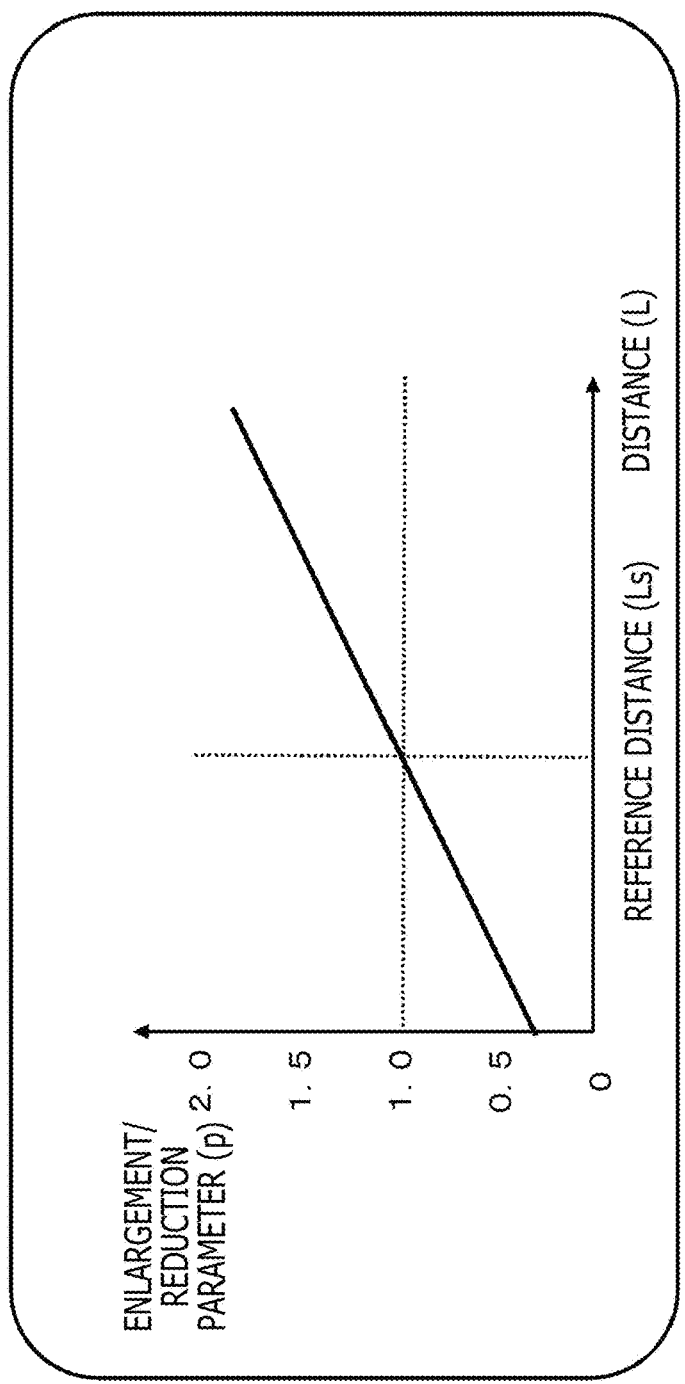

FIG. 18B is a diagram depicting one example of the enlargement/reduction parameter (scale value) according to the distance between the own device (own drone) and the controller.

In a graph in FIG. 18B, the horizontal axis represents the distance between the own device (own drone) and the controller while the vertical axis represents the enlargement/reduction parameter (scale value).

The value of the enlargement/reduction parameter (scale value) is set to become greater when the distance between the own device (own drone) and the controller is longer.

The drone holds, in a storage section (memory), for example, a table or a function corresponding to the graph in FIG. 18B and calculates the enlargement/reduction parameter (scale value) on the basis of the distance between the own device (own drone) and the controller calculated at step S205.

It is to be noted that, in the example in FIG. 18B, the distance between the own device (own drone) and the controller has a proportional relation with the enlargement/reduction parameter (scale value), but this is one example, and another relation may be set. However, the value of the enlargement/reduction parameter (scale value) is basically set to become greater with an increase in the distance between the own device (own drone) and the controller.

When the distance between the own device (own drone) and the controller is equal to the reference distance (Ls), the enlargement/reduction parameter (scale value)=1 is satisfied. When the distance between the own device (own drone) and the controller is longer than the reference distance (Ls), the enlargement/reduction parameter (scale value) is a value greater than 1.

On the other hand, when the distance between the own device (own drone) and the controller is shorter than the reference distance (Ls), the enlargement/reduction parameter (scale value) is a value less than 1.

At step S206, the data processing section of the drone calculates the enlargement/reduction parameter (scale value) by using the function stored in the storage section on the basis of the distance between the own device (own drone) and the controller calculated at step S205 or obtains the enlargement/reduction parameter (scale value) from the table stored in the storage section.

(Step S207)

Next, at step S207, the data processing section of the drone generates an enlarged/reduced track which is obtained by enlarging or reducing the reference track with use of the enlargement/reduction parameter (scale value) according to the distance between the own device (own drone) and the controller calculated or obtained at step S206.

That is, in a case where the distance between the own device (own drone) and the controller is longer than the reference distance (Ls), a track obtained by enlarging the reference track is generated.

On the other hand, in a case where the distance between the own device (own drone) and the controller is shorter than the reference distance (Ls), a track obtained by reducing the reference track is generated.

One of these tracks is set and used as the actual "selected-device identification track."

A specific example of a process of enlarging/reducing the track is depicted in FIG. 19.

As depicted in FIG. 19, when the distance between the own device (own drone) and the controller is equal to the reference distance (Ls), the enlargement/reduction parameter=1 is satisfied. Thus, the reference track is directly set.

When the distance between the own device (own drone) and the controller is longer than the reference distance (Ls), an enlarged track obtained by enlarging the reference track is generated.

On the other hand, when the distance between the own device (own drone) and the controller is shorter than the reference distance (Ls), a reduced track obtained by reducing the reference track is generated.

Figure 17:
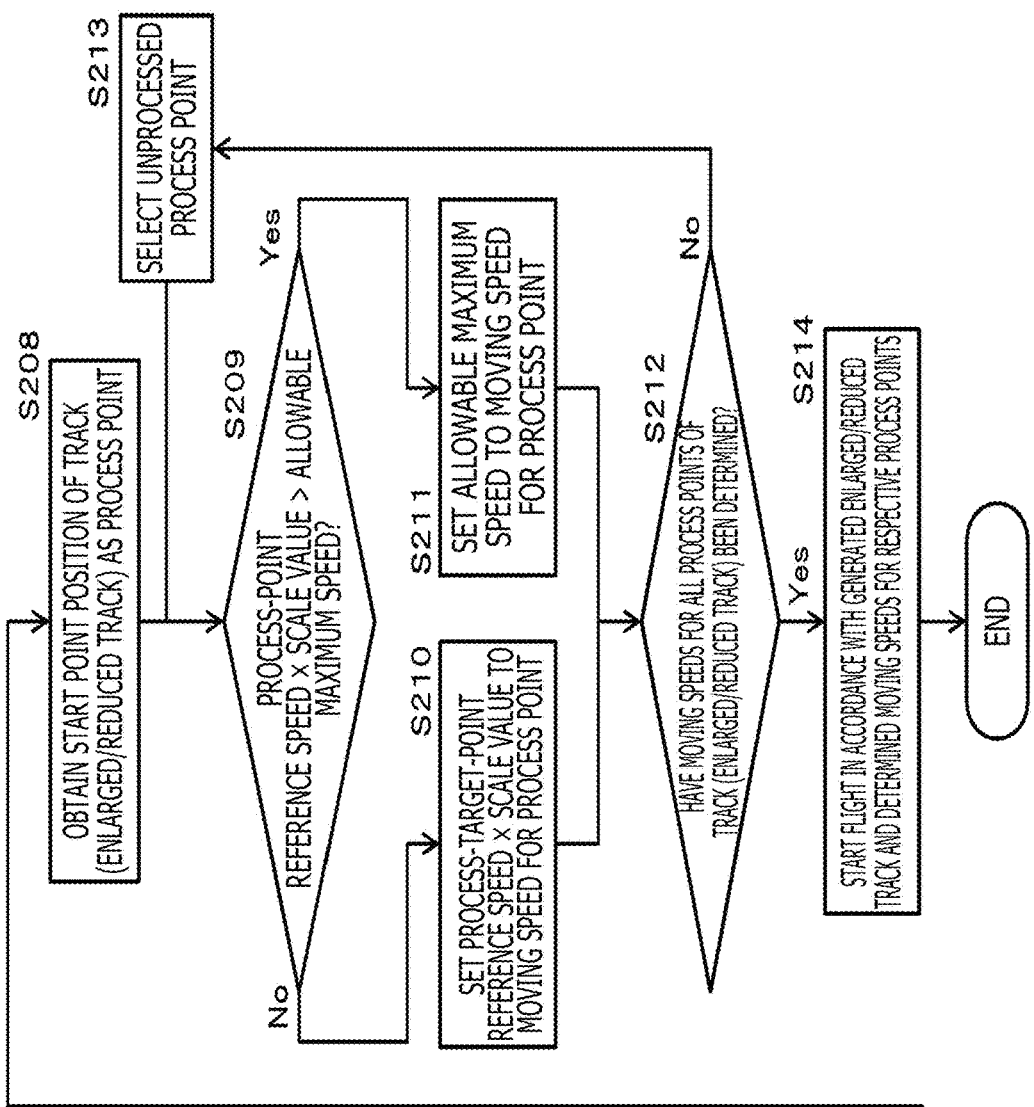
FIG. 17 is a diagram depicting a flowchart for explaining another process sequence which is executed by the mobile device (drone)

It is to be noted that, in the flowchart in FIG. 17, the speed for each of the points constituting the enlarged/reduced track determined at step S207 is calculated at step S208 and subsequent steps.

That is, the speed for each of the points constituting the enlarged/reduced track is also changed by application of the enlargement/reduction parameter (scale value) that has been applied to the enlarged/reduced track determined at step S207.

In a case where the distance between the own device (own drone) and the controller is equal to the reference distance (Ls), the enlargement/reduction parameter=1 is satisfied as depicted in FIG. 19, and a reference track is set. A speed for each of the points constituting the reference track is defined as a reference speed. Speeds for the respective constituting points are different from one another.

In a case where the distance between the own device (own drone) and the controller is longer than the reference distance (Ls), an enlarged track obtained by enlarging the reference track is generated. Speeds for the respective points constituting the enlarged track are also increased by application of the enlargement parameter that has been applied to generation of the enlarged track. That is, the speeds are made higher.

On the other hand, in a case where the distance between the own device (own drone) and the controller is shorter than the reference distance (Ls), a reduced track obtained by reducing the reference track is generated. Speeds for the respective points constituting the reduced track are also reduced by application of the reduction parameter that has been applied to generation of the reduced track. That is, the speeds are made lower.

However, a maximum speed allowable for the drone is prescribed. Thus, in a case where a speed calculated by application of the enlargement/reduction parameter (scale value) is higher than the allowable maximum speed, a process of setting the allowable maximum speed as a set speed is executed.

Hereinafter, step S208 and the subsequent steps of executing the speed setting process will be explained.

(Step S208)

At step S208, the data processing section of the drone first obtains, as a process point, a start position which is one point of the enlarged/reduced track generated at step S207.

This step is similar to that explained above with reference to FIG. 16. At this step, a start position to be processed first is obtained as a process point.

(Step S209)

Next, at step S209, the data processing section of the drone executes a determination process based on the following determination expression (Expression 1):

(process point reference speed)×(scale value)>allowable maximum speed     (Expression 1)

The (process point reference speed) refers to a speed at a process point of the reference track. This speed is the process point-corresponding reference speed already calculated at step S204.

The (scale value) is calculated or obtained at step S206 and is an enlargement/reduction parameter (scale value) according to the distance between the own device (own drone) and the controller.

The allowable maximum speed is a prescribed maximum speed that is allowable for the drone.

In a case where the above determination expression (Expression 1) is not satisfied, the process proceeds to step S210.

On the other hand, in a case where the above determination expression (Expression 1) is satisfied, the process proceeds to step S211.

(Step S210)

In a case where it is determined at step S209 that the above determination expression (Expression 1) is not satisfied, the process proceeds to step S210.

The case where the above determination expression (Expression 1) is not satisfied means that the speed calculated by (process point reference speed)×(scale value) is not higher than the allowable maximum speed.

In this case, at step S210, the data processing section of the drone sets, as a moving speed for the process point, the speed calculated by (process point reference speed)×(scale value).

(Step S211)

On the other hand, in a case where it is determined at step S209 that the above determination expression (Expression 1) is satisfied, the process proceeds to step S211.

The case where the above determination expression (Expression 1) is satisfied means that the speed calculated by (process point reference speed)×(scale value) is higher than the allowable maximum speed.

In this case, at step S211, the data processing section of the drone sets the allowable maximum speed as a moving speed for the process point instead of setting the speed calculated by (process point reference speed)×(scale value) as a moving speed for the process point.

(Steps S212 and S213)

After the speed for one process point is determined at step S210 or step S211, whether or not the moving speeds at all the process points of the track (enlarged/reduced track) have been determined is determined at step S212.

In a case where any of the process points is left unprocessed, the process proceeds to step S213 where a process point unprocessed is selected as a new process point, and a moving speed therefor is determined by execution of step S209 and the subsequent steps.

In a case where it is determined at step S212 that the moving speeds for all the process points of the track (enlarged/reduced track) have been determined, the process proceeds to step S214.

(Step S214)

Finally, at step S214, the drone starts flight in accordance with the generated enlarged/reduced track and the determined moving speeds for the respective process points. That is, flight in accordance with the "selected-device identification track" is started.

As explained above, the process in accordance with the flow in FIG. 17 is executed in a case where flight in accordance with the selected-device identification track explained above with reference to FIGS. 11A and 11B is carried out. That is, as depicted in FIGS. 11A and 11B, the track is made large in a case where the distance between the position of the user 1 who is manipulating the controller 10 (=the position of the controller 10) and the position of the drone is long, and the track is made small in a case where the distance is short. Further, the moving speeds are also adjusted.

As a result, the user 1 can easily identify the drone flying in accordance with the selected-device identification track even when the position of the drone is far.

[5-(2b) Process Sequence for Carrying Out Flight in Accordance with Selected-Device Identification Track in which User Viewpoint and Obstacle are Taken into consideration]

Next, (2b) process sequence for carrying out flight in accordance with a selected-device identification track in which a user viewpoint and an obstacle are taken into consideration will be explained.

The process sequence for carrying out flight in accordance with a selected-device identification track in which a user viewpoint and an obstacle are taken into consideration will be explained with reference to flowcharts in FIGS. 20 and 21.

This process sequence corresponds to that for a case where flight in accordance with the selected-device identification track which has been explained with reference to FIG. 12 is carried out. That is, in a case where a drone flies in accordance with a "selected-device identification track," if the position of a track for the flight is invisible to the user 1, for example, if the position is shielded by an obstacle, it is difficult for the user 1 to confirm the drone flying in accordance with the "selected-device identification track."

In such a case, the drone flies in accordance with the "selected-device identification track" after moving to a position visible to the user 1 as depicted in FIG. 12.

In order to execute this process, the drone may need to analyze the position of the user 1 (=the position of the controller 10) and the position of an obstacle.

In order to execute this process, the drone receives controller position information from the controller 10, generates a 3D map of a 3D space along the flight route, and analyzes the 3D position of the obstacle by analyzing the 3D map.

Figure 20:
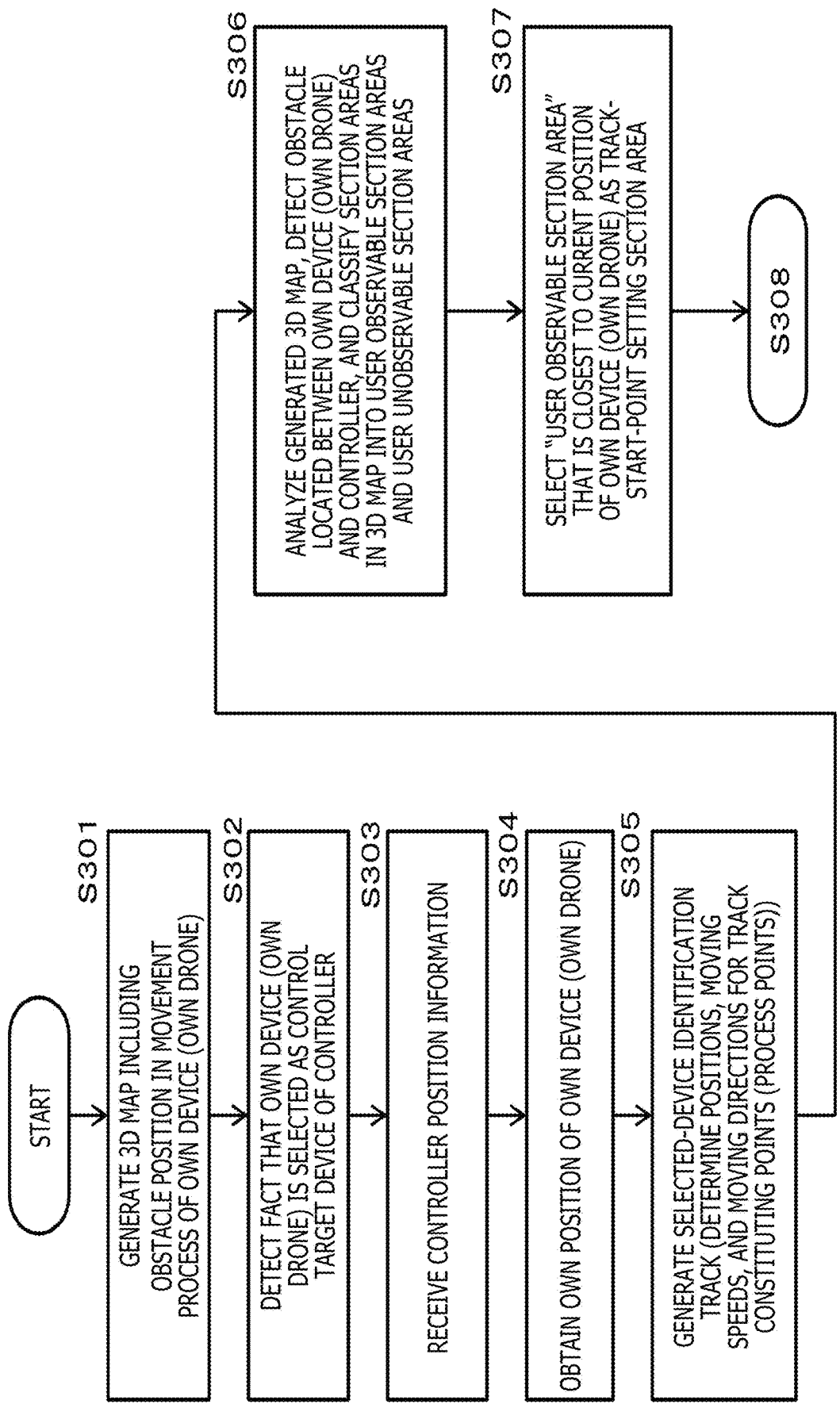
FIG. 20 is a diagram depicting a flowchart for explaining a further process sequence which is executed by the mobile device (drone)
Figure 21:
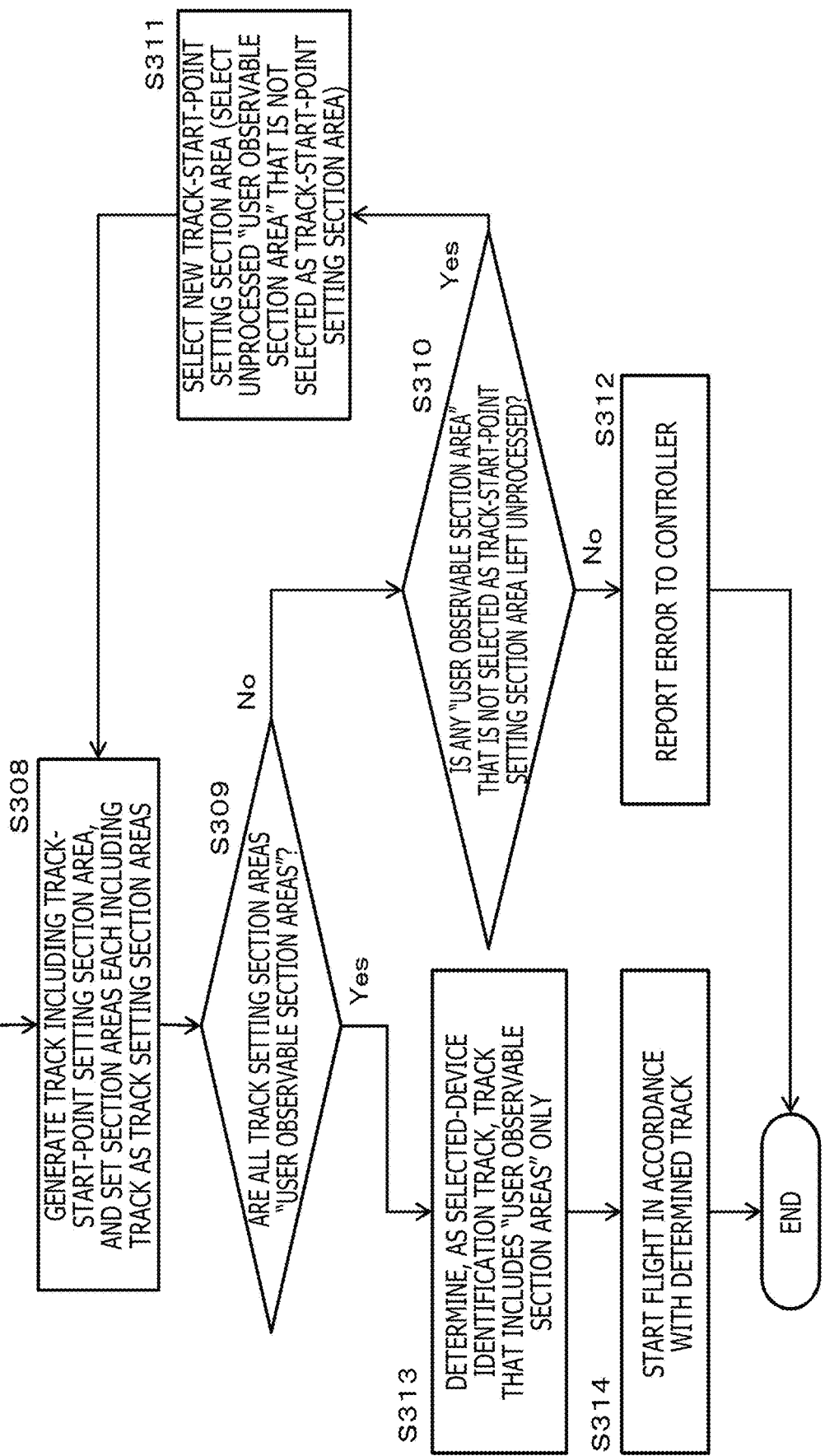
FIG. 21 is a diagram depicting a flowchart for explaining the further process sequence which is executed by the mobile device (drone)

The flowcharts in FIGS. 20 and 21 indicate a process sequence of obtaining the position of the user 1 (=the position of the controller 10) and analyzing the position of an obstacle by use of a 3D map, thereby carrying out flight in accordance with a selected-device identification track in which the user viewpoint and the obstacle are taken into consideration.

Hereinafter, the steps of the flow will be explained.

(Step S301)

First, at step S301, the data processing section of the drone generates a 3D map in which an obstacle position is included in a movement process of the own device (own drone).

The drone has a function of creating a 3D map based on an image photographed by a camera installed in the drone and information obtained by an own-position obtaining section such as an IMU or a GPS, thereby to generate a 3D map in which the position of an obstacle is included in the moving process of the own device (own drone).

Figure 22:
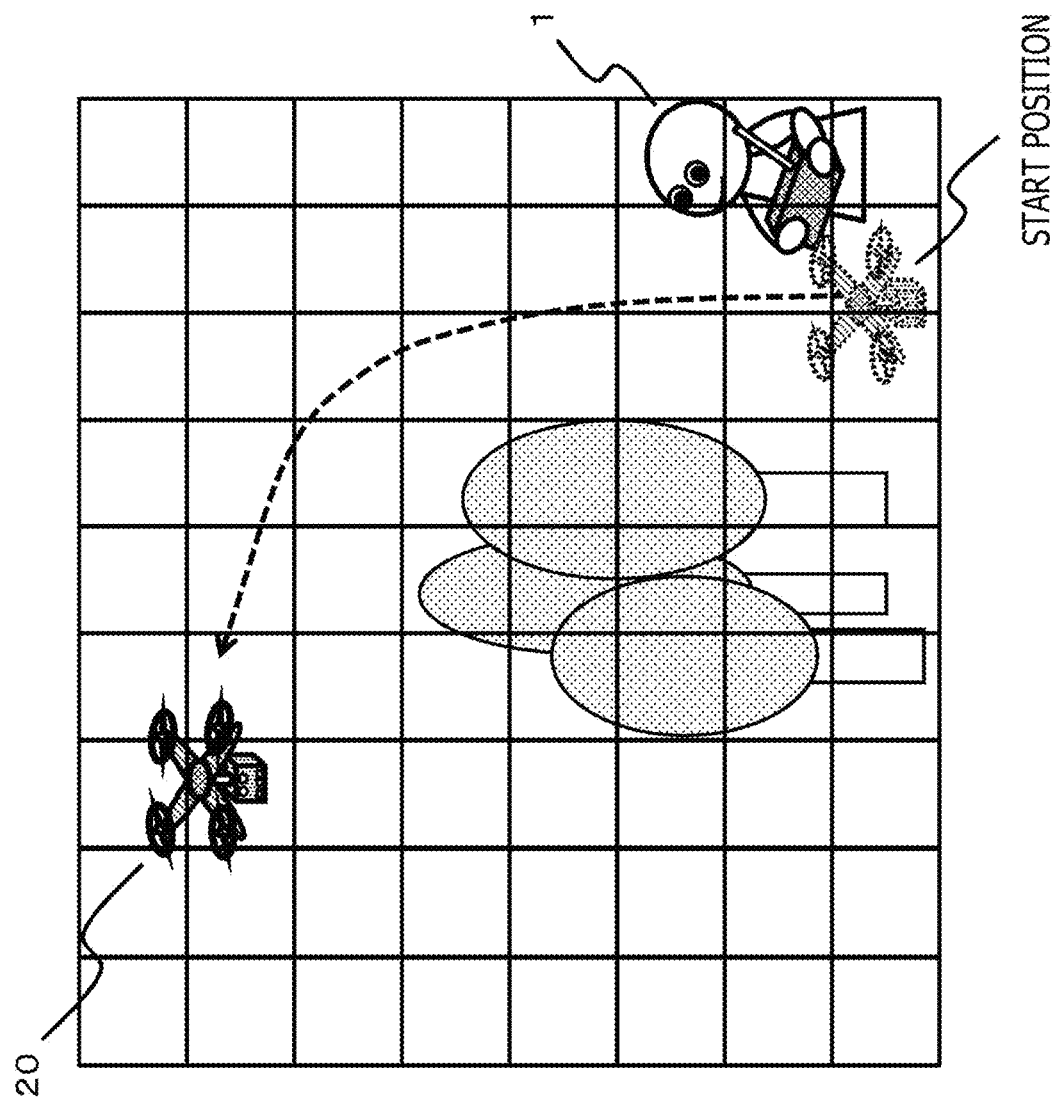
FIG. 22 is a diagram for explaining generation of a 3D map and a process using the 3D map.

FIG. 22 depicts one example of the 3D map generated by the drone. For example, in the 3D map generated by the drone, objects identified by units of section areas which are defined by a grid are recorded as depicted in FIG. 22. Although FIG. 22 is a drawing of a 2D plane, the 3D map actually supports a 3D space. Each rectangular section area depicted in FIG. 22 corresponds to one cube-shaped section area.

In the movement process of the own device (own drone) from a start position, the data processing section of the drone generates a 3D map, in which an obstacle position is included, by using information obtained by the camera, the IMU, the GPS, or the like. This 3D map generating process is constantly executed during the flight of the drone. The generated map is stored in the storage section of the drone.

(Step S302)

Next, at step S302, the data processing section of the drone detects the fact that the own device (own drone) is selected as the control target device of the controller.

As explained above with reference to FIGS. 4 and 5, the controller 10 transmits a selection signal to each drone. The selection signal indicates that the drone is selected as a control target device of a control signal that is transmitted from the controller 10.

It is to be noted that, as explained above, a signal in any of various forms can be used as the selection signal. For example, an ID set to each of drones can be used as the selection signal. Alternatively, a signal with a unique frequency set to each of drones may be used as the selection signal.

At step S302, the drone analyzes the selection signal included in signals transmitted from the controller 10 and detects the fact that the own device (own drone) is selected as the control target.

(Step S303)

Next, at step S303, the drone having detected the fact that the own device (own drone) is selected as the control target receives controller position information.

As explained above with reference to FIGS. 4 and 5, the controller 10 transmits controller position information (3D position information) to the drone as occasion demands, and the drone receives the transmitted position information and confirms the 3D position of the controller.

(Step S304)

Next, at step S304, the drone obtains the own position of the own device (own drone).

The drone includes an own-position information obtaining section such as an IMU or a GPS and obtains the current own position (3D position) of the drone on the basis of information obtained by the own-position information obtaining section.

(Step S305)

Next, at step S305, the drone generates a selected-device identification track.

Specifically, a process of generating the selected-device identification track is executed to determine positions, moving speeds, and moving directions for respective track constituting points (process points).

This process is similar to that explained above with reference to FIG. 16.

(Step S306)

Next, at step S306, the drone analyzes the 3D map generated at step S301 and detects an obstacle that is located between the own device (own drone) and the controller.

Further, by using the obstacle detection result, the drone classifies a plurality of section areas constituting the 3D map into user observable section areas and user unobservable section areas.

Figure 23:
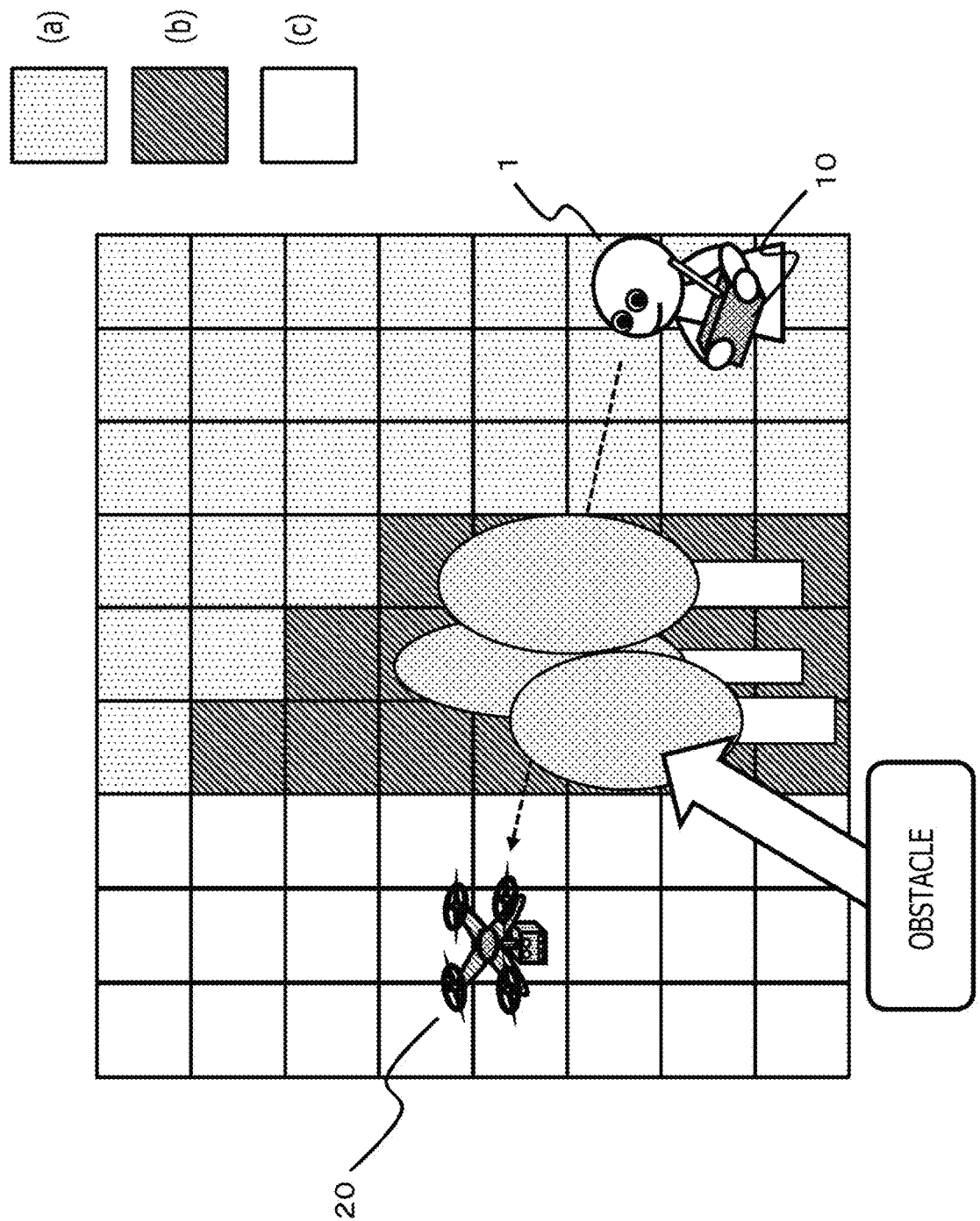
FIG. 23 is a diagram for explaining generation of a 3D map and a process using the 3D map.

For example, in a case where a drone 20 is flying at a position depicted in FIG. 23, a plurality of trees exist between the drone 20 and the controller 10 held by the user 1. The plurality of trees are detected as obstacles.

Further, by use of the obstacle detection result, a plurality of section areas constituting the 3D map are classified into user observable section areas and user unobservable section areas.

As depicted in FIG. 23, a plurality of section areas constituting the 3D map are each set as (a) user observable section area, (b) user unobservable section area, or (c) unprocessed section area, which is an area that is undistinguishable at this time point.

It is to be noted that the process of generating a 3D map and the process of classifying section areas are constantly executed during flight of the drone, and the updated data is stored as occasion demands in the storage section of the drone.

(Step S307)

Next, at step S307, the drone selects, as a track-start-point setting section area, a "user observable section area" that is closest to the current position of the own device (own drone).

A specific example of this process will be explained with reference to FIG. 24.

Figure 24:
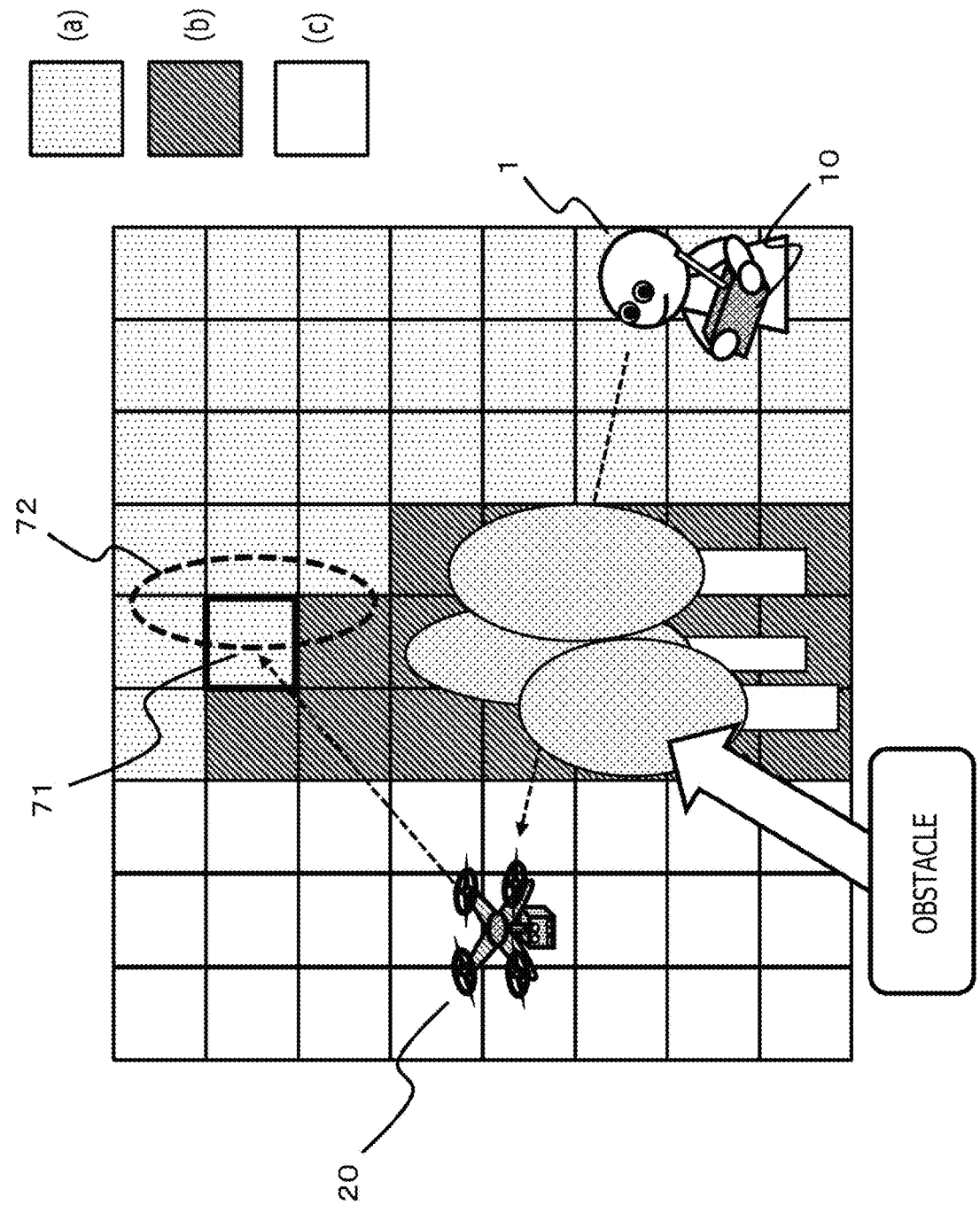
FIG. 24 is a diagram for explaining generation of a 3D map and a process using the 3D map.

When the drone 20 is currently located at a position as depicted in FIG. 24, a track-start-point setting section area 71 depicted in FIG. 24 is the closest "user observable section area."

(Step S308)

Next, at step S308, the drone generates a track including the track-start-point setting section area and sets, as track setting section areas, section areas each including the track.

At this step, a generated track 72 depicted in FIG. 24 is generated, for example.

(Step S309)

Next, at step S309, the drone determines whether or not all the track setting section areas are "user observable section areas."

In a case where at least one of the track setting section areas is not a "user observable section area," the process proceeds to step S310.

On the other hand, in a case where all the track setting section areas are "user observable section areas," the process proceeds to step S313.

In the example in FIG. 24, since the track setting section areas including the generated track 72 include at least one section area that is not a "user observable section area," the determination at step S309 is No. Then, the process proceeds to step S310.

(Steps S310 to S312)

In a case where the determination at step S309 is No, that is, in the case where the track setting section areas include at least one section area that is not a "user observable section area," the process proceeds to step S310.

In a case where the determination is made so, the data processing section of the drone determines, at step S310, whether or not any "user observable section area" that is not selected as the track-start-point setting section area is left unprocessed.

In a case where such an area is left unprocessed, the unprocessed "user observable section area" is set, at step S311, as a new track-start-point setting section area to generate a new track at step S308. Then, steps S308 and S309 are executed.

In a case where it is determined, at step S310, no "user observable section area" that is not selected as a track-start-point setting section area is left unprocessed, the process proceeds to step S312 to report an error to the controller. Then, the process is ended.

(Step S313)

On the other hand, in a case where the determination at step S309 is Yes, that is, in a case where all the track setting section areas are "user observable section areas," the process proceeds to step S313.

In a case where the determination is made so, the data processing section of the drone determines, at step S313, a track including "user observable section areas" only as a selected-device identification track.

(Step S314)

Finally, at step S314, the drone starts flight in accordance with the track determined at step S313.

Figure 25:
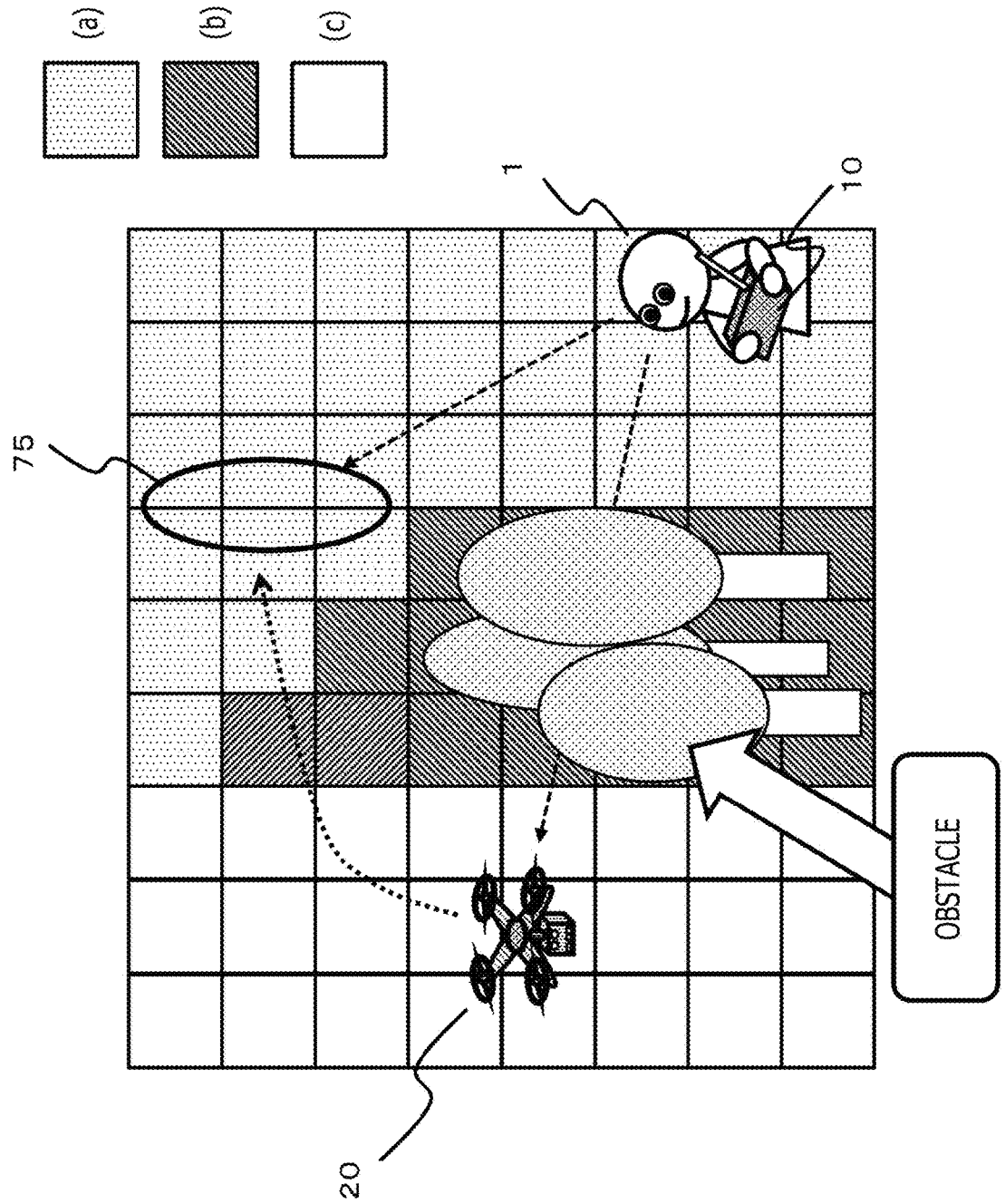
FIG. 25 is a diagram for explaining generation of a 3D map and a process using the 3D map.

Specifically, a selected-device identification track 75 depicted in FIG. 25, for example, is generated at step S313.

The selected-device identification track 75 depicted in FIG. 25 includes "user observable section areas" only.

The user 1 can completely observe the selected-device identification track 75 without any obstacle shielding the selected-device identification track 75 and thus can determine that the drone flying in accordance with this track is the control target drone of the controller 10.

[5-(3a) Process Sequence for Carrying Out Flight in Accordance with Selected-Device Identification Track in which Relative Position (Height) with Respect to Other Drones is Taken into Consideration]

Next, (3a) process sequence for carrying out flight in accordance with a selected-device identification track in which a relative position (height) with respect to other drones is taken into consideration will be explained.

Figure 26:
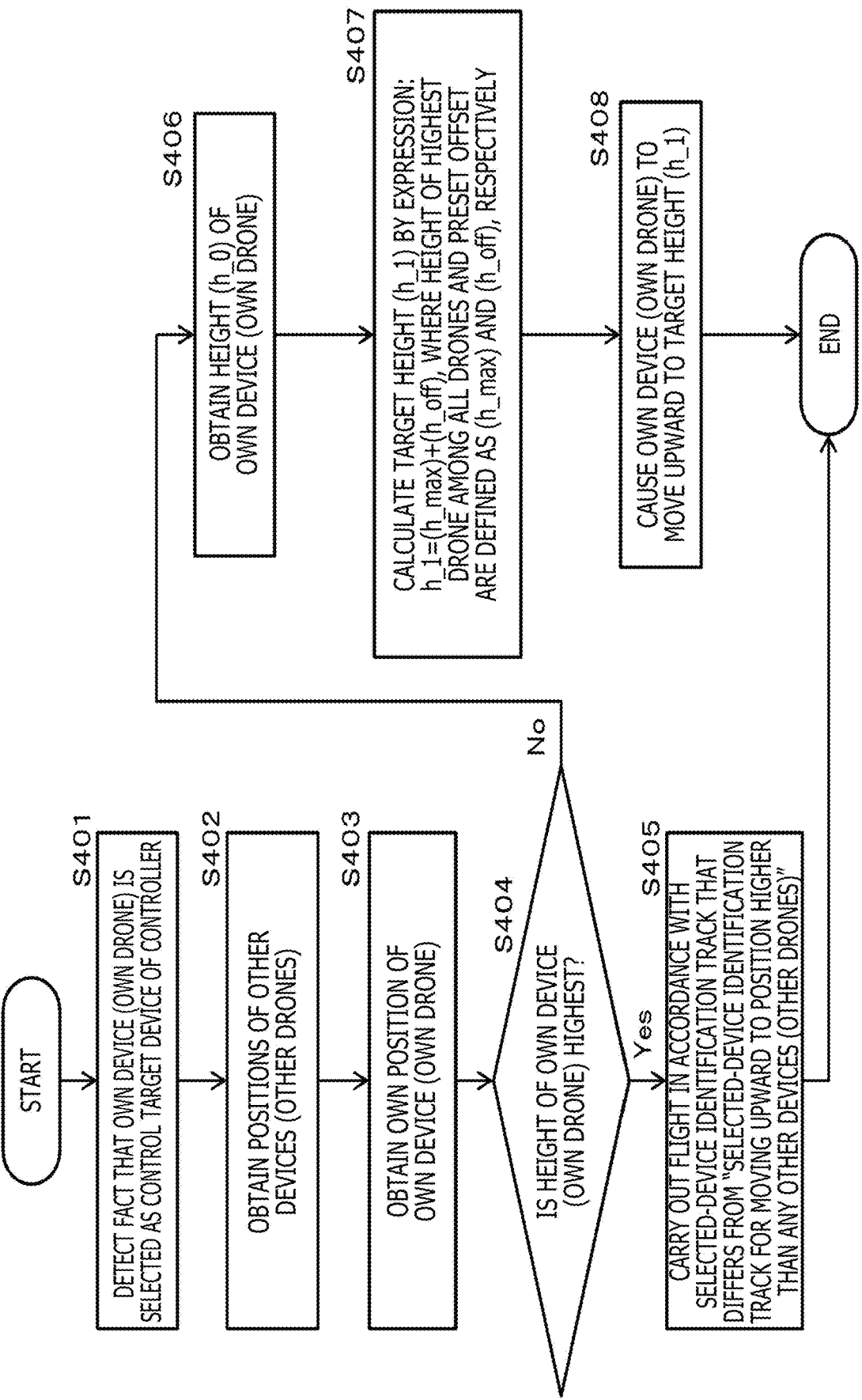
FIG. 26 is a diagram depicting a flowchart for explaining a further process sequence which is executed by the mobile device (drone)

The process sequence for carrying out flight in accordance with a selected-device identification track in which a relative position (height) with respect to other drones is taken into consideration will be explained with reference to a flowchart in FIG. 26.

This process sequence corresponds to that for a case where flight in accordance with the selected-device identification track which has been explained with reference to FIG. 13 is carried out. That is, as depicted in FIG. 13, the selected drone 31 that is selected as the control target by a selection signal from the controller 10 carries out flight to move upward to a position higher than the positions of the other non-selected drones 32a and 32b in order to make the user 1 know that the drone is a device (drone) selected as the control target device.

The user 1 who is observing drones while manipulating the controller 10 can confirm, by seeing a drone start to move upward to the highest position among the flying drones, that the drone at the highest position is the current control target drone of the controller 10.

Steps in the flow in FIG. 26 will be explained in order.

(Step S401)

First, at step S401, the data processing section of the drone detects the fact that the own device (own drone) is selected as the control target device of the controller.

As explained above with reference to FIGS. 4 and 5, the controller 10 transmits a selection signal to each drone. The selection signal indicates that the drone is selected as a control target device of a control signal that is transmitted from the controller 10.

It is to be noted that, as explained above, a signal in any of various forms can be used as the selection signal. For example, an ID set to each of drones can be used as the selection signal. Alternatively, a signal with a unique frequency set to each of drones may be used as the selection signal.

At step S401, the drone analyzes the selection signal included in signals transmitted from the controller 10 and detects the fact that the own device (own drone) is selected as the control target.

(Step S402)

Next, at step S402, the drone having detected the fact that the own device (own drone) is selected as the control target obtains positions of other devices (other drones).

As explained above with reference to FIGS. 4 and 5, the position information regarding the other devices (other drones) can be received through communication performed among the drones or communication performed via the controller.

(Step S403)

Next, at step S403, the drone having detected the fact that the own device (own drone) is selected as the control target obtains the own position of the own device (own drone).

The drone includes an own-position information obtaining section such as an IMU or a GPS and obtains the current own position (3D position) of the drone on the basis of information obtained by the own-position information obtaining section.

(Step S404)

Next, at step S404, the drone compares the position information regarding the own device (own drone) with the position information regarding the other devices (other drones) and determines whether or not the height of the own device (own drone) is the highest among those of the other devices (other drones).

In a case where the height of the own device (own drone) is determined to be the highest among those of the other devices (other drones), the process proceeds to step S405.

In a case where at least one of the other devices (other drones) is determined to be located at a position higher than the own device (own drone), the process proceeds to step S406.

(Step S405)

In a case where, at step S404, the height of the own device (own drone) is determined to be the highest among those of the other devices (other drones), the process proceeds to step S405.

In this case, at step S405, the drone carries out flight in accordance with a selected-device identification track that differs from a "selected-device identification track for moving upward to a position higher than any other mobile devices (other drones)."

Since the height of the own device (own drone) is already higher than those of any other devices (other drones), no flight track for moving upward to a highest position can exist. Accordingly, flight in accordance with another selected-device identification track is carried out.

(Step S406)

On the other hand, in a case where existence of another device (another drone) located at a position higher than the own device (own drone) is determined at step S404, the process proceeds to step S406.

In this case, the drone obtains the current height (h_0) of the own device (own drone) at step S406.

(Step S407)

Next, at step S407, the drone calculates a target height (h_1) to be reached as a result of upward movement of the own device (own drone).

The height of the highest drone of all the drones is defined as (h_max), and a preset offset is defined as (h_off). Then, the target height (h_1) is calculated on the basis of the following (Expression 2):

$$h\_1=(h\_\max)+(h\_\mathrm{off}) \quad \text{(Expression 2)}$$

(Step S408)

Next, at step S408, the drone causes the own device (own drone) to move upward to the target height (h_1) calculated at step S407.

The user 1 observing drones while manipulating the controller 10 can confirm, by seeing the drone start to move upward to the highest position among the flying drones, that the drone is the current control target drone of the controller 10.

[5-(3b) Process Sequence for Carrying Out Flight in Accordance with Selected-Device Identification Track in which Relative Position (Distance to User) with Respect to Other Drones is Taken into Consideration]

Next, (3b) process sequence for carrying out flight in accordance with a selected-device identification track in which a relative position (distance to a user) with respect to other drones is taken into consideration will be explained.

Figure 27:
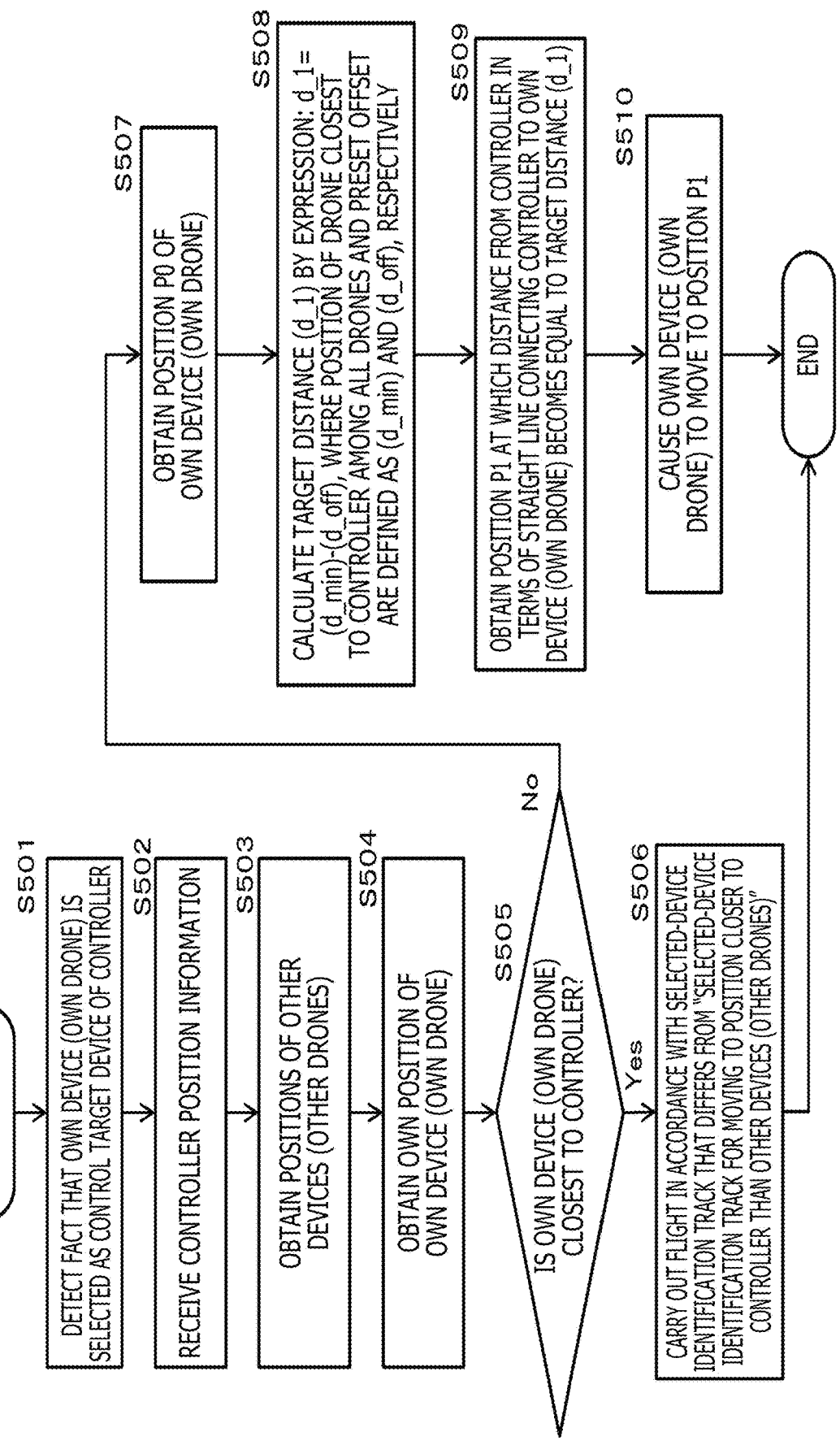
FIG. 27 is a diagram depicting a flowchart for explaining a further process sequence which is executed by the mobile device (drone)

The process sequence of carrying out flight in accordance with a selected-device identification track in which a relative position (distance to the user) with respect to other drones is taken into consideration will be explained with reference to a flowchart in FIG. 27.

This process sequence corresponds to that for a case where flight in accordance with the selected-device identification track which has been explained with reference to FIG. 14 is carried out. That is, as depicted in FIG. 14, the selected drone 31 selected as a control target by a selection signal from the controller 10 carries out flight to approach a position closer to the user 1 and the controller 10 than the other non-selected drones 32a and 32b in order to make the user 1 know that the drone is a device (drone) selected as the control target device.

The user 1 observing drones while manipulating the controller 10 can confirm, by seeing the drone move to a position closest to the user 1 among the flying drones, that the drone is the current control target drone of the controller 10.

Steps in the flow in FIG. 27 will be explained in order.

(Step S501)

First, at step S501, the data processing section of the drone detects the fact that the own device (own drone) is selected as the control target device of the controller.

As explained above with reference to FIGS. 4 and 5, the controller 10 transmits a selection signal to each of drones. The selection signal indicates that the drone is selected as a control target device of a control signal transmitted from the controller 10.

It is to be noted that, as explained above, a signal in any of various forms can be used as the selection signal. For example, an ID set to each of drones can be used as the selection signal. Alternatively, a signal with a unique frequency set to each of drones may be used as the selection signal.

At step S401, the drone analyzes a selection signal included in signals transmitted from the controller 10 and detects the fact that the own device (own drone) is selected as a control target.

(Step S502)

Next, at step S502, the drone having detected the fact that the own device (own drone) is selected as the control target receives controller position information.

As explained above with reference to FIGS. 4 and 5, the controller 10 transmits controller position information (3D position information) to the drone as occasion demands, and the drone receives the transmitted position information and confirms the 3D position of the controller.

(Step S503)

Next, at step S503, the drone having detected the fact that the own device (own drone) is selected as a control target obtains positions of other devices (other drones).

As explained above with reference to FIGS. 4 and 5, information regarding the positions of the other devices (other drones) can be received through communication performed among the drones or communication performed via the controller.

(Step S504)

Next, at step S504, the drone having detected the fact that the own device (own drone) is selected as the control target obtains the own position of the own device (own drone).

The drone includes an own-position information obtaining section such as an IMU or a GPS and obtains the current own position (3D position) of the drone on the basis of information obtained by the own-position information obtaining section.

(Step S505)

Next, at step S505, the drone compares the position information regarding the own device (own drone) with those of the other devices (other drones), thereby to determine whether or not the own device (own drone) is at a position closer to the position of the controller than any of the other devices (other drones).

In a case where the own device (own drone) is determined to be at a position closer to the controller than any of the other devices (other drones), the process proceeds to step S506.

In a case where any of the other devices (other drones) is at a position closer to the controller than the own device (own drone), the process proceeds to step S507.

(Step S506)

In a case where the own device (own drone) is determined, at step S505, to be located at a position closer to the controller than any of the other devices (other drones), the process proceeds to step S506.

In this case, at step S506, the drone carries out flight in accordance with a selected-device identification track that differs from a "selected-device identification track for moving to a position closer to the controller than any of the other devices (own drones)."

Since the own device (own drone) is already located at the position closer to the controller than any of the other devices (other drones), no flight track for moving to a position closest to the controller can exist. Thus, flight in accordance with another selected-device identification track is carried out.

(Step S507)

On the other hand, in a case where the position of any of the other devices (other drones) is determined, at step S505, to be closer to the controller than the own device (own drone), the process proceeds to step S507.

In this case, the drone obtains, at step S507, the current position (P0) of the own device (own drone).

(Step S508)

Next, at step S508, the drone calculates a target distance (d_1) that corresponds to a movement distance by which the own device (own drone) moves to be located at a position closest to the controller.

The position of a drone closest, among all the drones, to the controller is defined as (d_min), and a preset offset is defined as (d_off). Then, the target distance (d_1) is calculated on the basis of the following (Expression 3):

$$d\_1 = (d\_min) - (d\_off) \quad \text{(Expression 3)}$$

(Step S509)

Next, at step S509, the drone obtains a position P1 at which the distance from the controller is equal to the target distance (d_1) on a straight line connecting the controller to the own device (own drone).

(Step S510)

Finally, at step S510, the drone causes the own device (own drone) to move to the position P1 calculated at step S509.

The user 1 observing drones while manipulating the controller 10 can confirm, by seeing the drone start movement toward the direction of the user and reach a position closest to the user among the flying drones, that the drone is the current control target drone of the controller 10.

The following process sequences have been explained with reference to FIGS. 15 to 27. The following flight control sequences which are executed by a drone will be explained in order:

(1) Basic process sequence for carrying out flight in accordance with a selected-device identification track;

(2a) Process sequence for carrying out flight in accordance with a selected-device identification track in which a user viewpoint is taken into consideration;

(2b) Process sequence for carrying out flight in accordance with a selected-device identification track in which a user viewpoint and an obstacle are taken into consideration;

(3a) Process sequence for carrying out flight in accordance with a selected-device identification track in which a relative position (height) with respect to other drones is taken into consideration; and (3b) Process sequence for carrying out flight in accordance with a selected-device identification track in which a relative position (distance to the user) with respect to other drones is taken into consideration.

The above processes can be independently executed or can be executed by optional combination.

[6. Configuration Example of Mobile Device and Controller]

Next, a configuration example of a mobile device such as a drone and a controller according to another embodiment of the present disclosure will be explained.

First, a configuration example of a mobile device such as a drone according to this embodiment of the present disclosure will be explained with reference to FIG. 28.

Figure 28:
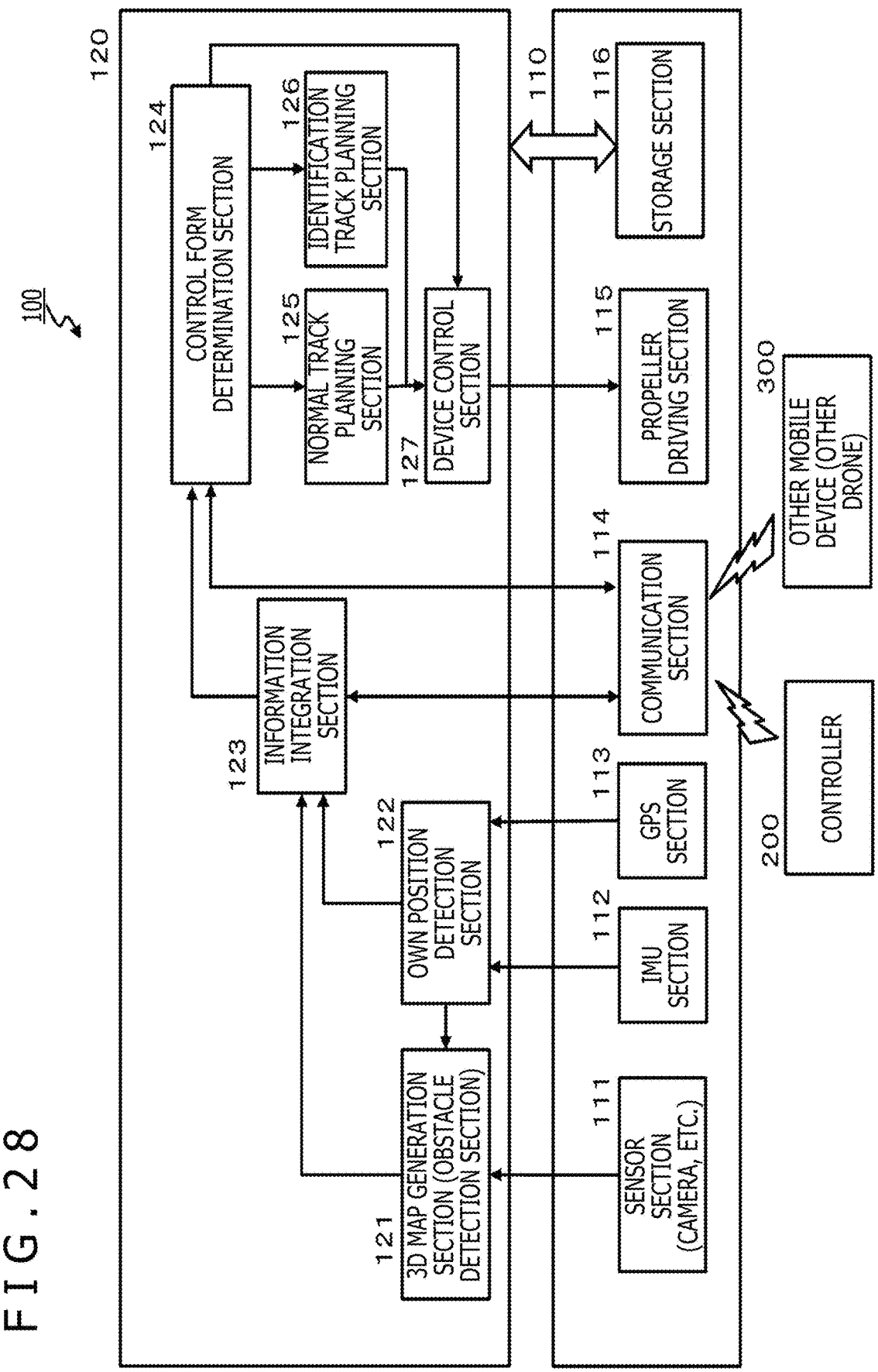
FIG. 28 is a diagram for explaining a configuration example of the mobile device (drone)

As depicted in FIG. 28, a mobile device (drone) 100 includes a hardware part 110 and a software part 120. The software part 120 corresponds to a data processing section that executes various processes in accordance with a program (software) stored in a storage section 116, for example. Specifically, the data processing section includes a processor such as a CPU having a program executing function such that various processes are executed by the processor executing the program.

First, an explanation of the hardware part 110 will be given.

The hardware part 110 includes a sensor section (camera, etc.) 111, an IMU section 112, a GPS section 113, a communication section 114, a propeller driving section 115, and the storage section 116.

The sensor section (camera, etc.) 111 includes various sensors such as a camera, a distance sensor, and a temperature sensor.

The IMU section 112 and the GPS section 113 are own-position information obtaining sections such as an IMU and a GPS as explained above.

The communication section 114 performs communication with a controller 200 or another mobile device 300.

The propeller driving section 115 is a section that drives a propeller for causing the drone to fly.

It is to be noted that the mobile device 100 is not limited to drones, and a vehicle or a robot may be used therefor. In a case where the mobile device 100 is a vehicle, the driving section includes wheels, etc. In a case where the mobile device 100 is a walking robot, the driving section is formed as a leg driving section for walking.

The storage section 116 stores a program which is executed by the software part 120, for example. Further, the storage section 116 is also used as a work area or a storage area for various parameters that are used to execute the program.

Moreover, the storage section 116 also stores sensor acquisition information such as camera photograph information acquired by the sensor section 111, own position information acquired by the IMU section 112 and the GPS section 113, and further, device position information received from the controller 200 and the other mobile device 300.

In addition, the storage section 116 is used as a storage region for 3D map data, etc. generated in the software part 120.

Next, an explanation of the software part 120 will be given.

As explained above, the software part 120 corresponds to a data processing section that executes various processes in accordance with the program (software) stored in the storage section 116, for example. Specifically, the software part 120 includes a processor such as a CPU having a program executing function such that various processes are executed by the processor executing the program.

A plurality of process blocks in the software part 120 in FIG. 28 are depicted as processing sections that are independent of one another according to the process types of a plurality of processes to be executed in the software part 120.

As depicted in FIG. 28, the software part 120 includes a 3D map generation section (obstacle detection section) 121, an own position detection section 122, an information integration section 123, a control form determination section 124, a normal track planning section 125, an identification track planning section 126, and a device control section 127.

The 3D map generation section (obstacle detection section) 121 generates a 3D map by using own position information, etc. calculated on the basis of information obtained by the sensor section 111 such as a camera and information obtained by the IMU section 112 and the GPS section 113, that is, an IMU, a GPS, etc., and further, detects an obstacle in the 3D map.

The own position detection section 122 calculates the own position (3D position) on the basis of information obtained by the IMU section 112 and the GPS section 113.

The information integration section 123 integrates 3D map information and obstacle detection information generated by the 3D map generation section (obstacle detection section) 121, the own position information calculated by the own position detection section 122, and reception information received from the controller 200 or the other mobile device 300 via the communication section 114 and inputs the integrated information to the control form determination section 124.

The control form determination section 124 determines a control form, such as a flight form, for the mobile device 100 on the basis of the 3D map information, obstacle detection information, and own position information inputted from the information integration section 123 and reception information received from the controller 200 and the other mobile device 300 via the communication section 114.

The normal track planning section 125 plans a normal-time movement track (flight track) for the mobile device 100.

The identification track planning section 126 plans a track for a selected-device identification movement (flight) to make a user know that the mobile device is selected as a control target.

The device control section 127 controls the propeller driving section 115 in order to move (fly) in accordance with the track planned by the normal track planning section 125 or the identification track planning section 126.

Next, a configuration example of the controller (remote control device) 200 will be explained with reference to FIG. 29.

Figure 29:
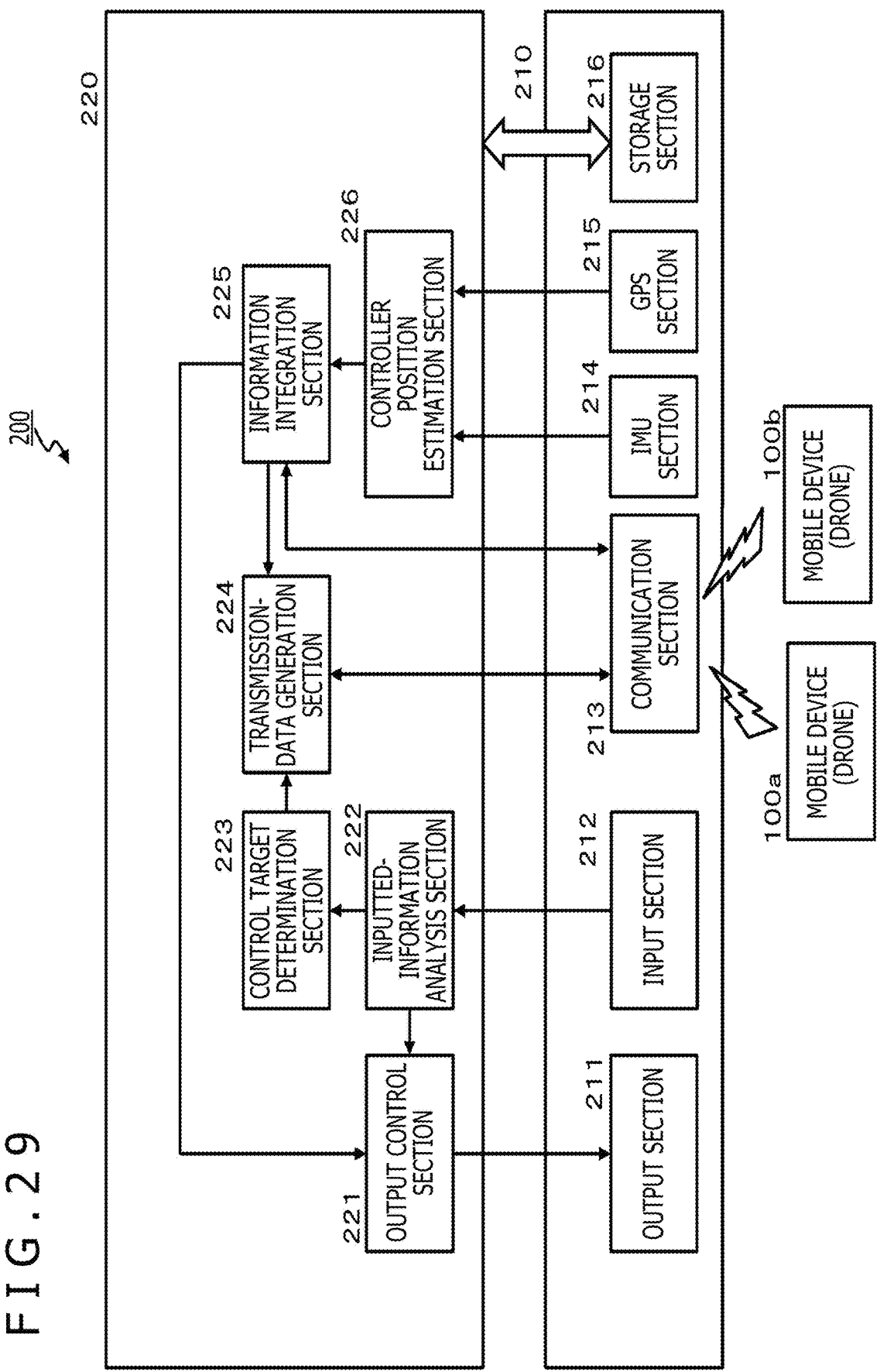
FIG. 29 is a diagram for explaining a configuration example of the controller (remote control device).

As depicted in FIG. 29, the controller (remote control device) 200 includes a hardware part 210 and a software part 220. The software part 220 corresponds to a data processing section that executes various processes in accordance with a program (software) stored in a storage section 216, for example. Specifically, the software part 220 includes a processor such as a CPU having a program executing function such that various processes are executed by the processor executing the program.

First, an explanation of the hardware part 210 will be given.

The hardware part 210 includes an output section 211, an input section 212, a communication section 213, an IMU section 214, a GPS section 215, and the storage section 216.

The output section 211 includes an image output section, a sound output section, a lamp, and the like, for example.

The image output section may include a touch panel such as a liquid crystal display, for example, so as to also have a function of the input section 212.

The sound output section is a loudspeaker. For example, the lamp is an LED lamp such as a display lamp of the control target drone which has been explained above with reference to FIG. 3.

The input section 212 can be operated by a user and includes an input section for a drone control signal, an input section for a selection of a control target drone, and the like. The input section 212 may be formed by use of a touch panel type display section.

The communication section 213 performs communication with a control target mobile device such as a drone.

As explained above, the IMU section 214 and the GPS section 215 are own-position information obtaining sections such as an IMU and a GPS.

The storage section 216 stores a program which is executed in the software part 220, for example. Moreover, the storage section 216 is used also as a work area or a storage area for various parameters that are used to execute the program.

Moreover, the storage section 216 also stores own position information obtained by the IMU section 214 and the GPS section 215, and further, position information received from the mobile device 100.

In addition, the storage section 216 is used also as a storage area for various data generated in the software part 220.

Next, an explanation of the software part 220 will be given.

As explained above, the software part 220 corresponds to a data processing section that executes various processes in accordance with the program (software) stored in the storage section 216, for example. Specifically, the software part 220 includes a processor such as a CPU having a program executing function such that various processes are executed by the processor executing the program.

A plurality of process blocks in the software part 220 in FIG. 29 are depicted as processing sections that are independent of one another according to the process types of a plurality of processes to be executed in the software part 220.

As depicted in FIG. 29, the software part 220 includes an output control section 221, an inputted-information analysis section 222, a control target determination section 223, a transmission-data generation section 224, an information integration section 225, and a controller position estimation section 226.

The output control section 221 generates information to be outputted to the output section 211, and outputs the information. For example, the output control section 221 generates display information that is used to switch a control target drone, information indicating a control target drone, and the like and outputs the information to a display section.

The inputted-information analysis section 222 analyzes information inputted via the input section 212. Specifically, the inputted-information analysis section 222 receives and analyzes control-target-drone switching information, etc. from a user and outputs the analysis result to the control target determination section 223.

The control target determination section 223 receives the analysis information from the inputted-information analysis section 222 and determines a drone that is a control target of the controller 200. Information regarding the determination is inputted to the transmission-data generation section 224.

In accordance with the control target information determined by the control target determination section 223, the transmission-data generation section 224 transmits a selection signal to a mobile device (drone) via the communication section 213.

The information integration section 225 generates integrated information by integrating a controller position calculated by the controller position estimation section 226, drone position information received from the drone via the communication section 213, etc. and outputs the integrated information to the transmission-data generation section 224 to transmit the information to the drone via the transmission-data generation section 224 or the communication section 213.

In addition, the integrated information is transferred to the output control section 221 to cause the information to be outputted to the output section 211.

The controller position estimation section 226 calculates the position (3D position) of the controller 200 on the basis of information obtained by the IMU section 214 and the GPS section 215, etc.

[7. Conclusion of Configuration According to Present Disclosure]

Embodiments of the present disclosure have been explained above in detail with reference to the specific embodiment. However, it is obvious that a person skilled in the art can make modification or substitution on the embodiment within the gist of the present disclosure. That is, the present technology has been disclosed in a form of exemplifications, and thus, should not be limitedly interpreted. In order to assess the gist of the present disclosure, the claims should be considered.

It is to be noted that the technology disclosed herein may have the following configurations.

(1) A mobile device including:
a communication section that performs communication with a controller which selectively transmits control signals to a plurality of mobile devices; and
a data processing section that performs movement control of the own device, in which
the data processing section
confirms whether or not an own-device selection signal which indicates that the own device is selected as a control target device has been received from the controller, and
upon confirming reception of the own-device selection signal, performs movement control to cause the own device to move in accordance with a selected-device identification track which indicates that the own device is selected as the control target device.

(2) The mobile device according to (1), in which
the selected-device identification track is formed according to a movement form which is any one of forward/rearward horizontal movement, leftward/rightward horizontal movement, upward/downward vertical movement, or rotational movement in a particular direction.

(3) The mobile device according to (1) or (2), in which
the mobile device includes a drone, and
the selected-device identification track includes a flight track of the drone.

(4) The mobile device according to (3), in which
the selected-device identification track is formed according to a flight form which is any one of forward/rearward horizontal flight, leftward/rightward horizontal flight, upward/downward vertical flight, rotational flight in a particular direction, swing flight, tilted flight, or vertically-inverted flight.

(5) The mobile device according to any one of (1) to (4), in which
upon confirming reception of the own-device selecting signal, the data processing section generates the selected-device identification track and causes the own device to move in accordance with the generated selected-device identification track.

(6) The mobile device according to (5), in which
the data processing section generates, as the selected-device identification track, a track for moving in a plane that is substantially orthogonal to a visual line direction of a user who is manipulating the controller.

(7) The mobile device according to (5) or (6), in which
the data processing section generates the selected-device identification track which varies in size depending on a distance between the controller and the own device.

(8) The mobile device according to (7), in which
the data processing section generates the selected-device identification track that is larger in size when the distance between the controller and the own device is longer.

(9) The mobile device according to any one of (5) to (8), in which
the data processing section generates the selected-device identification track in a region that is observable by a user who is manipulating the controller.

(10) The mobile device according to (9), in which
the data processing section determines whether or not any obstacle exists between the controller and the own device, detects a region where no obstacle exists between the controller and the own device in a case where any obstacle exists between the controller and the own device, and generates the selected-device identification track in the detected region.

(11) The mobile device according to (9) or (10), in which
the data processing section generates a three-dimensional map based on information acquired during movement of the own device and detects, by using the generated three-dimensional map, the region that is observable by the user who is manipulating the controller.

(12) The mobile device according to any one of (5) to (11), in which the data processing section generates, as the selected-device identification track, a track for moving to a highest position among positions of all mobile devices that are to be control targets of the controller.

(13) The mobile device according to any one of (5) to (11), in which the data processing section generates, as the selected-device identification track, a track for moving to a position closest to the controller among positions of all mobile devices that are to be control targets of the controller.

(14) The mobile device according to any one of (5) to (13), in which the data processing section generates, as the selected-device identification track, a track in which positions of points constituting the track and moving speeds at the respective track constituting points are specified.

(15) A mobile body control system including:

a controller that selectively transmits control signals to a plurality of mobile devices; and a mobile device that moves upon receiving a control signal from the controller, in which the controller transmits, to one of the plurality of mobile devices, a selection signal which indicates that the one mobile device is selected as a control target, and the mobile device confirms whether or not an own-device selecting signal which indicates that the own device is selected as a control target device has been received from the controller, and upon confirming reception of the own-device selecting signal, performs movement control to cause the own device to move in accordance with a selected-device identification track which indicates that the own device is selected as the control target device.

(16) A mobile body control method which is executed by a mobile device, the mobile device including a communication section that performs communication with a controller which selectively transmits control signals to a plurality of mobile devices, and a data processing section that performs movement control of the own device, the method including:

causing the data processing section to confirm whether or not an own-device selecting signal which indicates that the own device is selected as a control target device has been received from the controller; and causing the data processing section to, upon confirming reception of the own-device selecting signal, perform movement control to cause the own device to move in accordance with a selected-device identification track which indicates that the own device is selected as the control target device.

(17) A mobile body control method which is executed by a mobile body control system including a controller that selectively transmits control signals to a plurality of mobile devices and a mobile device that moves upon receiving a control signal from the controller, the method including:

causing the controller to transmit, to one of the plurality of mobile devices, a selection signal which indicates that the one mobile device is selected as a control target; and causing the mobile device to confirm whether or not an own-device selecting signal which indicates that the own device is selected as a control target device has been received from the controller, and upon confirming reception of the own-device selecting signal, perform movement control to cause the own device to move in accordance with a selected-device identification track which indicates that the own device is selected as the control target device.

(18) A program for causing a mobile device to perform mobile body control, the mobile device including a communication section that performs communication with a controller which selectively transmits control signals to a plurality of mobile devices and a data processing section that performs movement control of the own device, the program including:

causing the data processing section to confirm whether or not an own-device selecting signal which indicates that the own device is selected as a control target device has been received from the controller; and causing the data processing section to, upon confirming reception of the own-device selecting signal, perform movement control to cause the own device to move in accordance with a selected-device identification track which indicates that the own device is selected as the control target device.

Further, a series of the processes explained herein can be executed by hardware, software, or a composite structure thereof. In a case where the processes are executed by software, a program having a sequence of the processes recorded therein can be executed after being installed into a memory incorporated in dedicated hardware in a computer or can be executed after being installed into a general-purpose computer capable of executing various processes. For example, such a program may be previously recorded in a recording medium. The program can be installed in the computer from the recording medium. Alternatively, the program can be received over a network such as a local area network (LAN) or the Internet and be installed into a recording medium such as an internal hard disk.

It is to be noted that the processes explained herein are not necessarily executed in the described time-series order, and the processes may be executed parallelly or separately, as appropriate or in accordance with the processing capacity of a device to execute the processes. Further, in the present description, a system refers to a logical set structure including a plurality of devices, and the devices of the structure are not necessarily included in the same casing.

As explained so far, according to the configuration of one embodiment according to the present disclosure, a user who is manipulating a controller can identify a control target device without taking the eyes off mobile devices such as drones.

Specifically, for example, the configuration includes a communication section that performs communication with a controller which selectively transmits control signals to a plurality of mobile devices, and a data processing section that performs movement control of the own device. The data processing section confirms whether or not an own-device selecting signal which indicates that the own device is selected as a control target device has been received from the controller and causes, upon reception of the own-device selecting signal, the own device to move in accordance with a selected-device identification track which indicates that the own device is selected. For example, a drone starts flight in accordance with a selected-device identification track such as a forward/rearward horizontal flight track or a leftward/rightward horizontal flight track.

With this configuration, a configuration for allowing a user, who is manipulating a controller, to identify a control target device without taking the eyes off mobile devices such as drones is realized.

What is claimed is:

1. A mobile device comprising:
communication circuitry configured to perform communication with a controller which selectively transmits control signals to the mobile device and other mobile devices; and
processing circuitry configured to
determine whether or not an own-device selection signal which indicates that the mobile device is selected as a control target device of the controller has been received from the controller,
in response to determining that the own-device selection signal has been received from the controller, generate a selected-device identification track which indicates that the mobile device is selected as the control target device, and
perform movement control to cause the mobile device to move in accordance with the selected-device identification track, wherein
the processing circuitry of the mobile device generates the selected-device identification track with a first size in a case where a distance between the mobile device and the controller which transmits the control signal to the mobile is a first distance, and performs movement control to cause the mobile device to move in accordance with the selected-device identification track with the first size, and
the processing circuitry of the mobile device generates the selected-device identification track with a second size that is larger than the first size in a case where the distance between the mobile device and the controller which transmits the control signal to the mobile is a second distance that is longer than the first distance, and performs movement control to cause the mobile device to move in accordance with the selected-device identification track with the second size.

2. The mobile device according to claim 1, wherein the selected-device identification track is formed according to a movement form which is any one of forward/rearward horizontal movement, leftward/rightward horizontal movement, upward/downward vertical movement, or rotational movement in a particular direction.

3. The mobile device according to claim 1, wherein the mobile device includes a drone, and
the selected-device identification track includes a flight track of the drone.

4. The mobile device according to claim 3, wherein the selected-device identification track is formed according to a flight form which is any one of forward/rearward horizontal flight, leftward/rightward horizontal flight, upward/downward vertical flight, rotational flight in a particular direction, swing flight, tilted flight, or vertically-inverted flight.

5. The mobile device according to claim 1, wherein the processing circuitry generates, as the selected-device identification track, a track for moving in a plane that is orthogonal to a visual line direction of a user who is manipulating the controller.

6. The mobile device according to claim 1, wherein the processing circuitry generates the selected-device identification track in a region that is observable by a user who is manipulating the controller.

7. The mobile device according to claim 6, wherein the processing circuitry determines whether or not any obstacle exists between the controller and the mobile device, detects a region where no obstacle exists between the controller and the mobile device in a case where any obstacle exists between the controller and the mobile device, and generates the selected-device identification track in the detected region.

8. The mobile device according to claim 6, wherein the processing circuitry generates a three-dimensional map based on information acquired during movement of the mobile device and detects, by using the generated three-dimensional map, the region that is observable by the user who is manipulating the controller.

9. The mobile device according to claim 1, wherein the processing circuitry generates, as the selected-device identification track, a track for moving to a highest position among positions of all mobile devices, including the mobile device and the other mobile devices, that are to be control targets of the controller.

10. The mobile device according to claim 1, wherein the processing circuitry generates, as the selected-device identification track, a track for moving to a position closest to the controller among positions of all mobile devices, including the mobile device and the other mobile devices, that are to be control targets of the controller.

11. The mobile device according to claim 1, wherein the processing circuitry generates, as the selected-device identification track, a track in which positions of points constituting the track and moving speeds at the respective track constituting points are specified.

12. The mobile device according to claim 1, wherein the selected-device identification track is a circular track.

13. The mobile device according to claim 1, wherein the processing circuitry of the mobile device generates, as the selected-device identification track, a circular track with the first size in the case where the distance between the mobile device and the controller which transmits the control signal to the mobile is the first distance, and performs movement control to cause the mobile device to move in accordance with the circular track with the first size, and
the processing circuitry of the mobile device generates, as the selected-device identification track, another circular track with the second size that is larger than the first size in the case where the distance between the mobile device and the controller which transmits the control signal to the mobile is the second distance that is longer than the first distance, and performs movement control to cause the mobile device to move in accordance with the another circular track with the second size.

14. A mobile body control system comprising:
a controller that selectively transmits control signals to a mobile device and other mobile devices; and
the mobile device that moves upon receiving the control signal from the controller, wherein
the controller transmits, to one of the mobile device and the other mobile devices, a selection signal which indicates that the one mobile device is selected as a control target, and
the mobile device includes
communication circuitry configured to perform communication with the controller, and
processing circuitry configured to
determine whether or not the selection signal has been received from the controller,
in response to determining that the selection signal has been received from the controller, generate a selected-device identification track which indicates that the mobile device is selected as the control target device, and perform movement control to cause the mobile device to move in accordance with the selected-device identification track, the processing circuitry of the mobile device generates the selected-device identification track with a first size in a case where a distance between the mobile device and the controller which transmits the control signal to the mobile is a first distance, and performs movement control to cause the mobile device to move in accordance with the selected-device identification track with the first size, and the processing circuitry of the mobile device generates the selected-device identification track with a second size that is larger than the first size in a case where the distance between the mobile device and the controller which transmits the control signal to the mobile is a second distance that is longer than the first distance, and performs movement control to cause the mobile device to move in accordance with the selected-device identification track with the second size.

15. A mobile body control method of a mobile device, the method comprising:

performing, using communication circuitry of the mobile device, communication with a controller which selectively transmits control signals to the mobile device and other mobile devices;

determining, using processing circuitry of the mobile device, whether or not an own-device selection signal which indicates that the mobile device is selected as a control target device of the controller has been received from the controller;

in response to determining that the own-device selection signal has been received from the controller, generating, using the processing circuitry, a selected-device identification track which indicates that the mobile device is selected as the control target device; and performing, using the processing circuitry, movement control to cause the mobile device to move in accordance with the selected-device identification track, wherein the selected-device identification track with a first size is generated, using the processing circuitry of the mobile device, in a case where a distance between the mobile device and the controller which transmits the control signal to the mobile is a first distance, and movement control to cause the mobile device to move in accordance with the selected-device identification track with the first size is performed using the processing circuitry of the mobile device, and the selected-device identification track with a second size that is larger than the first size is generated, using the processing circuitry of the mobile device, in a case where the distance between the mobile device and the controller which transmits the control signal to the mobile is a second distance that is longer than the first distance, and movement control to cause the mobile device to move in accordance with the selected-device identification track with the second size is performed using the processing circuitry of the mobile device.

16. A mobile body control method of a mobile body control system that includes a controller and a mobile device, the method comprising:

transmitting, using the controller, control signals to the mobile device and other mobile devices;

transmitting, using the controller, to one of the mobile device and the other mobile devices, a selection signal which indicates that the one mobile device is selected as a control target;

performing, using communication circuitry of the mobile device, communication with the controller;

determining, using processing circuitry of the mobile device, whether or not the selection signal has been received from the controller;

in response to determining that the selection signal has been received from the controller, generating, using the processing circuitry a selected-device identification track which indicates that the mobile device is selected as the control target device; and performing, using the processing circuitry, movement control to cause the mobile device to move in accordance with the selected-device identification track, wherein the selected-device identification track with a first size is generated, using the processing circuitry of the mobile device, in a case where a distance between the mobile device and the controller which transmits the control signal to the mobile is a first distance, and movement control to cause the mobile device to move in accordance with the selected-device identification track with the first size is performed using the processing circuitry of the mobile device, and the selected-device identification track with a second size that is larger than the first size is generated, using the processing circuitry of the mobile device, in a case where the distance between the mobile device and the controller which transmits the control signal to the mobile is a second distance that is longer than the first distance, and movement control to cause the mobile device to move in accordance with the selected-device identification track with the second size is performed using the processing circuitry of the mobile device.

17. A non-transitory computer readable medium including executable instructions, which when executed by a computer of a mobile device cause the computer to execute a mobile body control method, the method comprising:

performing communication with a controller which selectively transmits control signals to the mobile device and other mobile devices;

determining whether or not an own-device selection signal which indicates that the mobile device is selected as a control target device of the controller has been received from the controller;

in response to determining that the own-device selection signal has been received from the controller, generating a selected-device identification track which indicates that, the mobile device is selected as the control target device; and performing movement control to cause the mobile device to move in accordance with the selected-device identification track, wherein the selected-device identification track with a first size is generated, using the computer of the mobile device, in a case where a distance between the mobile device and the controller which transmits the control signal to the mobile is a first distance, and movement control to cause the mobile device to move in accordance with the selected-device identification track with the first size is performed using the computer of the mobile device, and the selected-device identification track with a second size that is larger than the first size is generated, using the computer of the mobile device, in a case where the distance between the mobile device and the controller which transmits the control signal to the mobile is a second distance that is longer than the first distance, and movement control to cause the mobile device to move in accordance with the selected-device identification track with the second size is performed using the computer of the mobile device.

* * * * *